US008787953B1

United States Patent
Koster

(10) Patent No.: US 8,787,953 B1
(45) Date of Patent: *Jul. 22, 2014

(54) INTEGRATING TWO-DIMENSIONAL BARCODES AND EMBEDDED LINKS WITH CALL CENTER OPERATION

(71) Applicant: Noble Systems Corporation, Atlanta, GA (US)

(72) Inventor: Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,094

(22) Filed: Aug. 1, 2013

Related U.S. Application Data

(63) Continuation of application No. 13/461,515, filed on May 1, 2012, now Pat. No. 8,526,922.

(51) Int. Cl.
  *H04W 4/00* (2009.01)
  *H04M 3/523* (2006.01)

(52) U.S. Cl.
  CPC .................................. *H04M 3/5231* (2013.01)
  USPC ....................................................... 455/466

(58) Field of Classification Search
  USPC ........ 715/716; 705/14.69, 14.46, 14.2, 14.56; 455/567, 566; 235/462.45
  See application file for complete search history.

(56) References Cited

U.S. PATENT DOCUMENTS

| | | | |
|---|---|---|---|
| 8,374,915 B2 | 2/2013 | Hayes, Jr. et al. | |
| 8,403,222 B2 * | 3/2013 | Kindberg et al. | ........ 235/462.45 |
| 2002/0164006 A1 | 11/2002 | Weiss | |
| 2004/0028213 A1 | 2/2004 | Goss | |
| 2005/0149399 A1 * | 7/2005 | Fukunaga et al. | .............. 705/14 |
| 2005/0265322 A1 | 12/2005 | Hester | |
| 2006/0256957 A1 | 11/2006 | Fain et al. | |
| 2007/0094073 A1 | 4/2007 | Dhawan et al. | |
| 2008/0142599 A1 | 6/2008 | Benillouche et al. | |
| 2009/0082044 A1 | 3/2009 | Okuyama et al. | |
| 2009/0254824 A1 * | 10/2009 | Singh | ............................ 715/716 |
| 2010/0128862 A1 | 5/2010 | Vendrow | |
| 2011/0173040 A1 | 7/2011 | Curtis et al. | |
| 2011/0173041 A1 * | 7/2011 | Breitenbach et al. | ........ 705/7.13 |
| 2011/0258156 A1 * | 10/2011 | Fitzpatrick et al. | ............. 706/50 |

OTHER PUBLICATIONS

9 QR Code Data Types, http://notixtech.com/blog/9_qr_code_data_types, Mar. 3, 2011.

* cited by examiner

*Primary Examiner* — Kiet Doan

(57) ABSTRACT

In various embodiments, advertising campaigns can be defined that incorporate technologies such as two-dimensional bar codes or embedded links in electronic material, for directing a user to communicate with a call center. For instance, in particular embodiments, the reading of a two-dimensional bar code by a user with a smart phone may cause various forms of communication requesting a return communication. The communication from the smart phone may be sent to, and received at, the call center, where a calling campaign associated with an advertising campaign is identified using information associated with the communication. A responding communication may be initiated from the call center to the user.

25 Claims, 23 Drawing Sheets

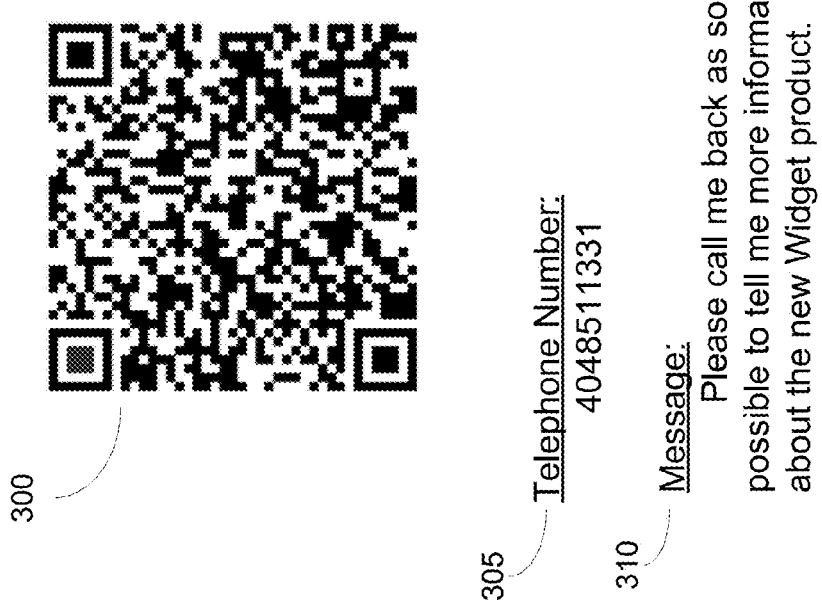

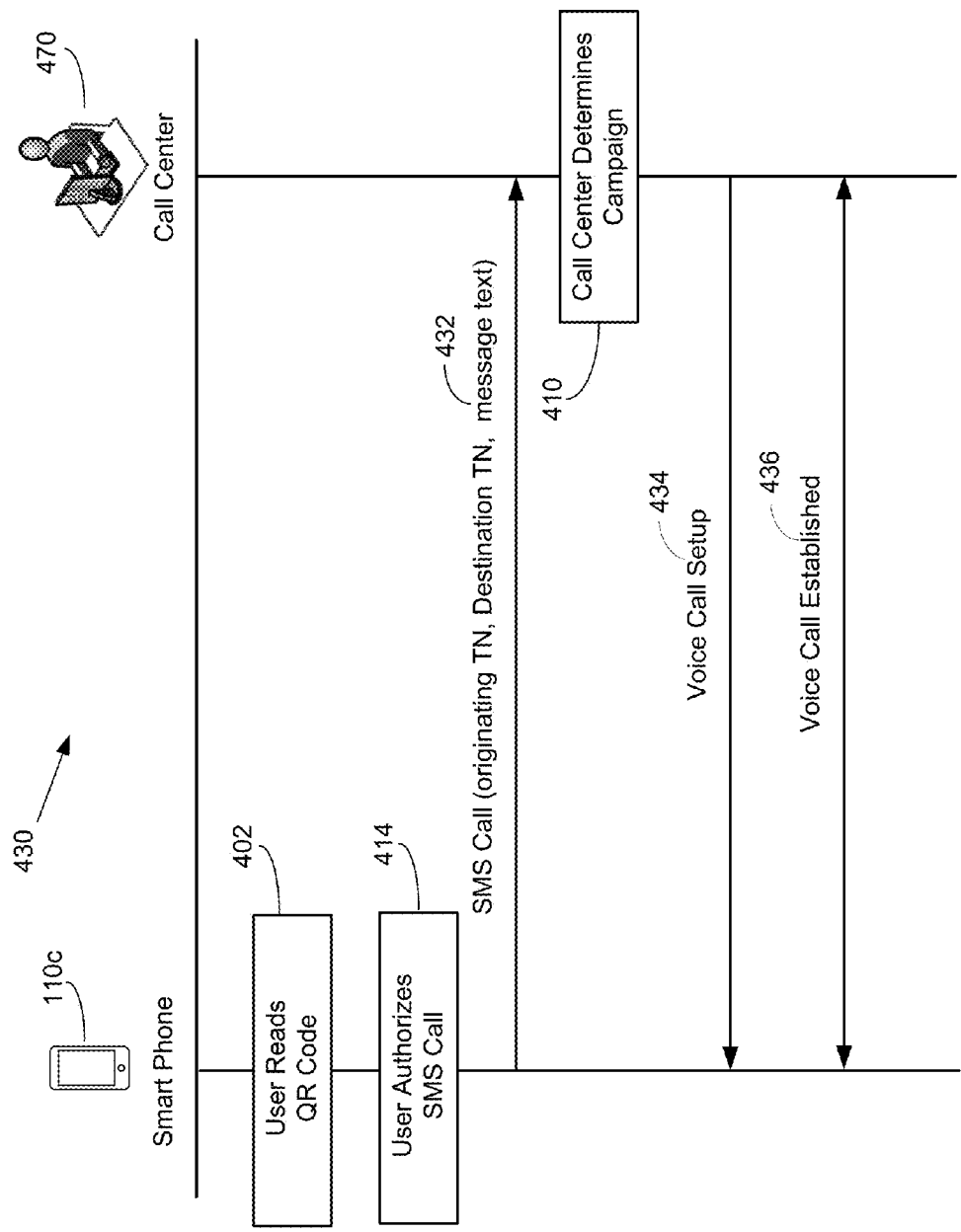

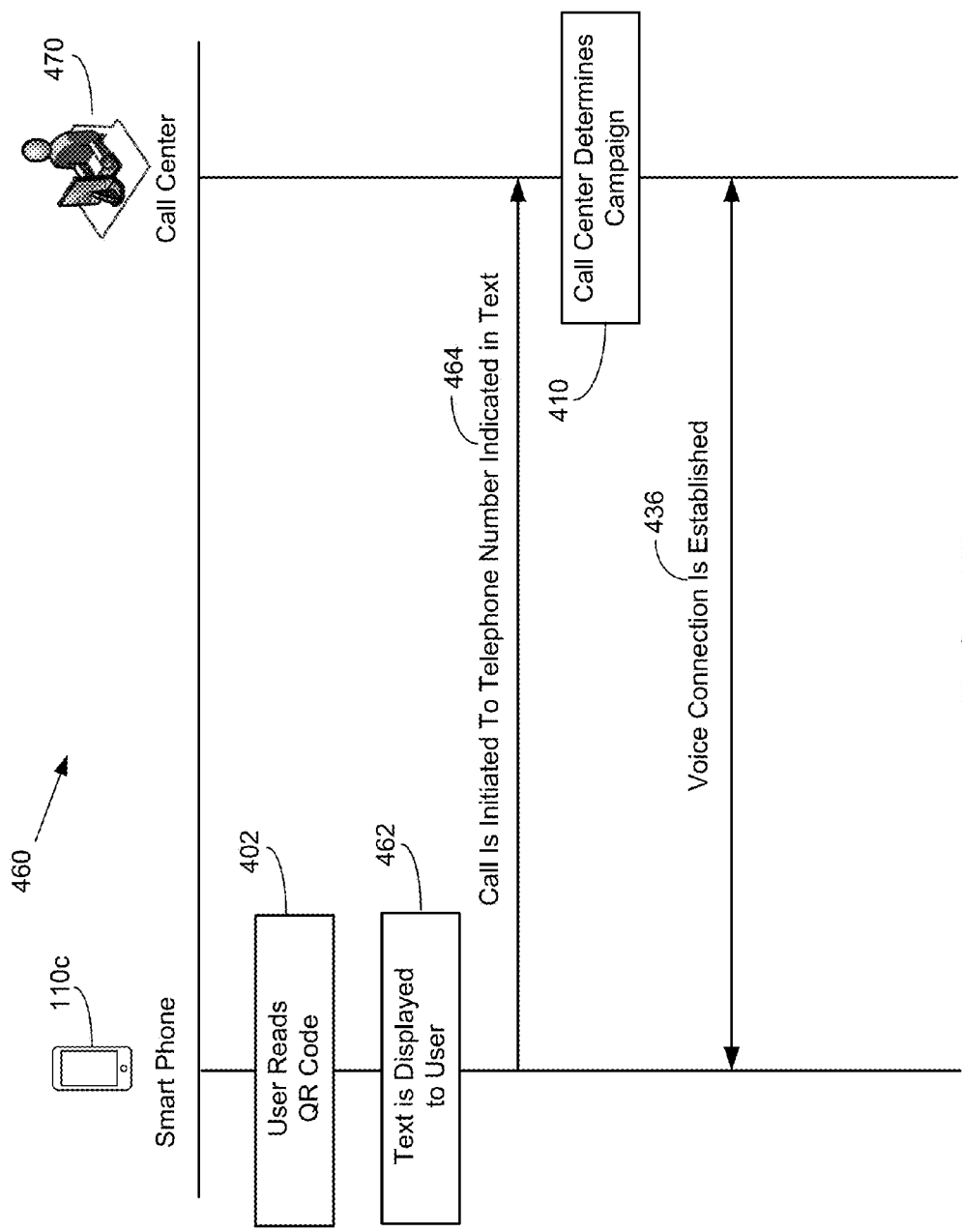

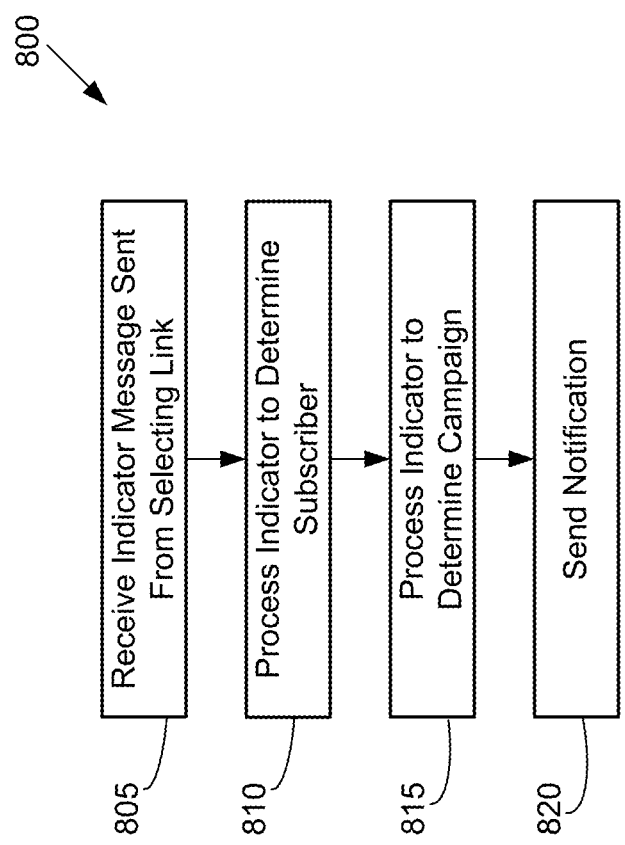

INTEGRATING TWO-DIMENSIONAL BARCODES AND EMBEDDED LINKS WITH CALL CENTER OPERATION

CROSS REFERENCE TO RELATED APPLICATIONS

This application is a continuation of U.S. patent application Ser. No. 13/461,515, entitled "Integrating Two-Dimensional Barcodes and Embedded Links With Call Center Operation", filed on May 1, 2012, the contents of which are incorporated by reference; and this application is related to U.S. patent application Ser. No. 13/461,513, filed on May 1, 2012, entitled "Managing Electronic Consent for Calling Campaigns", and U.S. patent application Ser. No. 13/461,541, filed on May 1, 2012, entitled "Using Quick Response Codes to Generate An Electronic Consent Database", the contents of both of which are incorporated by reference for all that they teach.

BACKGROUND

Advertisers are always seeking new ways to use a variety of media and advertising technologies to drive contact from potential customers. One such technique is to incorporate developed technologies which may afford greater convenience and may appeal to younger consumers. For instance, electronic communication technologies may allow a consumer of advertising to choose whether to easily interact with advertising encountered by the consumer.

One such developed technology is two-dimensional barcodes ("2D barcode") used in conjunction with mobile applications in mobile processing devices, such as smart phones, equipped with digital cameras. The digital camera is used to "read" the 2D barcode and perform an action based on data encoded into the barcode. For example, users can use their smart phone to read a 2D barcode displayed on a product's packaging or in an advertisement for the product found in a magazine to receive further information about the product.

Another developed technology to drive contact from potential customers is links (e.g., hyperlinks) embedded in electronic reading material such as digital books and periodicals (e.g., magazines), for example. For instance, many devices, such as e-books, smart phones, tablets, and personal computers used to display electronic reading material are configured to communicate over channels such as Wi-Fi and/or cellular networks. Hyperlinks may be embedded in electronic reading material that may perform an action such as linking to a website, sound, video, or additional reading media over such communication channels in order to enhance the enjoyment of the reader. For example, an electronic periodical may have a review of a new music album that has been released that includes links to one or more sound bite files of the songs found on the album. As a result, a reader of the review can click on a link for a particular song to listen to the sound bite of the song.

While use of 2D barcodes and links is often used for linking to web sites or other electronic media, the use of such technologies can also furnish other capabilities that provide a more personalized response for information requests that involve, for example, accessing a call center. The use of such technologies can be effective in allowing a consumer of advertising to respond immediately to an advertisement and receive information, for a variety of purposes. It is with respect to these and other considerations that the disclosure herein is presented.

BRIEF SUMMARY

Technologies are generally presented herein pertaining to integrating 2D barcode usage with call center operation. This frequently involves producing and distributing an advertisement for a product or service bearing a 2D barcode that can be read by a user employing a camera-equipped device, such as a smart phone, executing an appropriate application. Reading the 2D barcode results in the processing device performing various actions using data encoded in the 2D barcode. For example, in particular embodiments, the actions may result in an electronic communication being sent to a call center that can process a request from the user for additional information on the product or service being advertised. The call center can use data in the communication to ascertain a calling campaign and respond either in the same form as the initial electronic communication or in a different form.

The subject matter disclosed herein may be implemented as a computer-controlled apparatus, a method, a computing system, or as an article of manufacture such as a computer readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIG. 3A shows one embodiment of a QR code encoded to send a text message requesting product information;

FIGS. 4A-4G show various embodiments of using developed technologies for contacting a call center;

FIG. 8 shows one embodiment of a process flow for a publisher to process a communication generated as a result of a link being activated;

DETAILED DESCRIPTION

Figure 1:
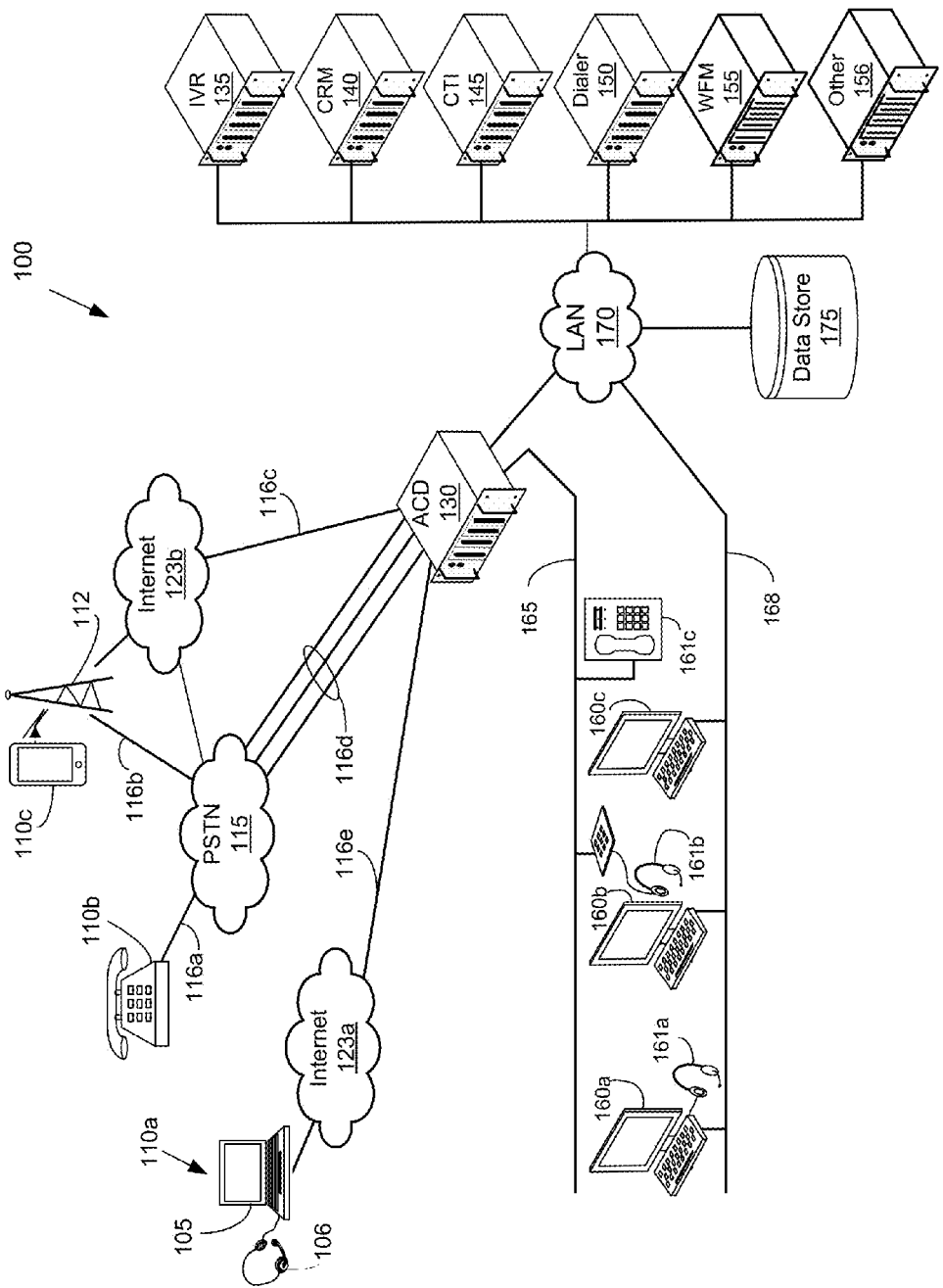
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 106a-160c, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. The CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160a-160c over facilities 168 along with routing the call to the agent's workstation phone 161a-161c. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response server ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160b to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116c, 116d, 116e to the PSTN 115 and/or Internet providers 123b for originating calls. After the calls are originated, a transfer operation by the ACD 130 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in the call center architecture 100 is a workforce management ("WFM") server 155. In various embodiments, this server 155 maintains information to generate agents' schedules to effectively handle inbound/outbound calls. For instance, in particular embodiments, the WFM server 155 may maintain historical call volume information for call campaigns and may forecast expected call volume to predict the number of agents needed to handle the call volume at a defined service level. The WFM server 155 may then apply information about available agents to generate a work roster of agents. In other words, the WFM server 155 may schedule agents for their work shifts according to the anticipated needs of the call campaigns.

Finally, in various embodiments, the call center architecture 100 may include one or more other processing devices 156 to perform various functions. For example, in one particular embodiment, the call center architecture 100 includes a processing device 156 to serve as a quality assurance system that records communications fielded by agents and/or allows managers to monitor communications to ensure these communications are being handled correctly.

Although the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150 and/or WFM server 155 may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Figure 2:
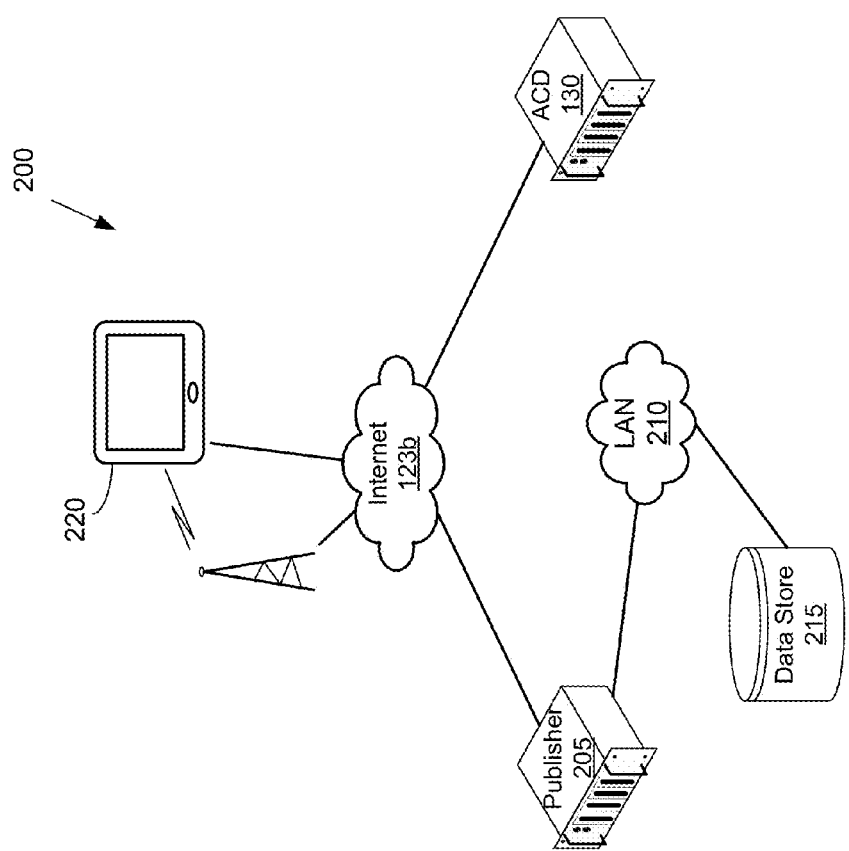
FIG. 2 shows one embodiment of an architecture involving a publisher and a call center in communication and illustrating the various technologies disclosed herein.

Turning now to FIG. 2, a second architecture 200 is shown involving a provider of electronic reading material ("publisher") in communication with a call center. In one embodiment, a publisher is a provider of information to a user on a subscription basis. For instance, the publisher may be an entity such as Amazon®, Apple®, or Barnes and Noble® that routinely provides electronic versions of books, news print, and periodicals on electronic device(s) 220 used by various users. These users may be "subscribers" with the publisher and the device(s) 220 may be proprietary devices specifically configured to be used for electronic reading material provided by the publisher or may be "general use" devices that may have the capability to read such material. For example, the device(s) 220 may be Amazon's® Kindle® devices and/or Barnes and Nobles'® Nook® devices configured to specifically read electronic reading material provided by these publishers. In addition, the device(s) 220 may be a tablet such as an Apple's® IPad® device and/or desktop or laptop computer that have functionality in addition to reading electronic reading material provided by a particular publisher. In other embodiments, the device(s) 220 may be a smart phone. For instance, users may download an application to their "general use" device(s) 220 that allow them to view and read electronic reading materials from publishers such as Amazon® and Barnes and Nobles®.

As shown in FIG. 2, a user's device 220 may communicate with a particular publisher using different channels according to various embodiments. For instance, in particular embodiments, a user's device 220 may have Internet capabilities and may be able to communicate with a publisher over the Internet 123b. As one of ordinary skill in the art will appreciate in light of this disclosure that the device 220 may communicate over wired or wireless connections. Thus, a user's device 220 may be in communication with one or more components, such as a publisher server 205, located within the publisher's system. In addition, in particular embodiments, a user's device 220 may have capabilities to be able to communicate with the publisher in similar fashion over other channels such as a cellular network. Likewise, a user's device 220 may communicate with a call center (e.g., ACD 130) over similar channels as the devices 110a, 110b, 110c described above and such communications may be electronic data and/or voice calls.

Further, in particular embodiments, one or more components in the publisher's system, such as the publisher server 205, may be in communication over one or more networks 210 and may retrieve information from a data store 215 in response to a link embedded in an electronic reading material being activated. Similar to the call enter, depending on the embodiment, the data store 215 may include one or more databases storing different information such as, for example, records on subscribers and/or call centers. Further, the data store 215 may be integrated with the publisher server 205 or segregated as a standalone medium or media.

Those skilled in art will recognize FIGS. 1 and 2 represent one possible configuration of each architecture 100, 200, and that variations are possible with respect to the protocols, facilities, components, technologies, and equipment used. For example, various algorithms and queuing arrangements may be defined to efficiently process calls. In other configurations, the ACD 130 may be configured to process not only voice calls, but also other forms of communication, and perform corresponding call processing functions for email, text, chats, or facsimile calls. Alternatively, a web server (not shown in FIG. 1 or 2) may receive or originate email, chats, and text communications, as well as interact with other components in the call center and/or publisher.

Quick Response Codes and Links

Quick response ("QR") codes are one format for two-dimensional barcodes ("2D barcode") known for encoding information. Typically, a camera-equipped mobile device, such as a smart phone, "reads" the QR barcode using the digital camera that is controlled by an appropriate mobile application. A number of barcode reader mobile applications can be downloaded for different devices, including but not limited to the Apple iPhone® and Android® based smart phones. There are various standard or proprietary forms of two-dimensional barcodes, and for illustrations purposes, the two-dimensional barcode known as a QR code is used to illustrate the concepts herein since this is a common format. However, depending on the embodiment, other 2D barcodes formats can be used with the technologies disclosed herein. A number of web sites or service providers can provide 2D barcode generators that can receive information and generate the 2D barcode.

QR codes can indicate an action to be performed by the mobile device and data to be used in performing that action. Typically, the action and data are encoded by the spacing of the black and white squares in a unique pattern using defined encoding rules. As a result, different formats of QR codes can be used to encode various amount of information, with different capabilities. The actions that may be invoked by the QR code include, for example: providing contact information, defining a calendar event, indicating an email address, indicating a telephone number to dial, providing geo-location information to an application, sending a SMS message, displaying text, logging onto to a Wi-Fi network, and invoking an application, such as Skype® that can initiate a VoIP call.

In particular embodiments, the mobile application may be designed so that user input is required before completing the action that operates using the data. For example, the QR code can load data for initiating a telephone call or an SMS message, and the mobile application can request the user to confirm the action before performing the action. Depending on the embodiment, such a configuration may be preferred as opposed to automatically originating the phone call or sending the SMS message without requiring confirmation.

Further, in particular embodiments, when a QR code is read for sending an SMS message, the QR code conveys the destination address (e.g., including but not limited to a telephone number) that is to be used and/or pre-populates the contents of the text portion of the SMS message. Thus, in these particular embodiments, the user does not need to enter this information, and such capability may avoid the user from mistyping or incorrectly completing such information.

FIG. 3A illustrates a QR code 300 according to one embodiment. Because each QR code 300 is typically designed to encode data in a pattern, the pattern may vary based on the encoding mode and data. For example, one format allows up to 7,089 characters to be encoded, while another format allows 2,953 bytes to be encoded. The embodiment of the QR code 300 illustrated in FIG. 3A encodes a destination address in the form of a telephone number 305, which in this case is 404 851-1331. The QR code 300 also encodes a text message 310 for the body of the SMS message, which reads "[p]lease call me back as soon as possible to tell me more information about the new Widget product." Thus for this embodiment, upon reading the QR code using a smart phone, a pre-populated text message addressed to the destination address with the contents indicated therein is presented to the user, along with a prompt for confirmation for sending the message. In other embodiments, the message can be immediately sent.

Figure 3B:
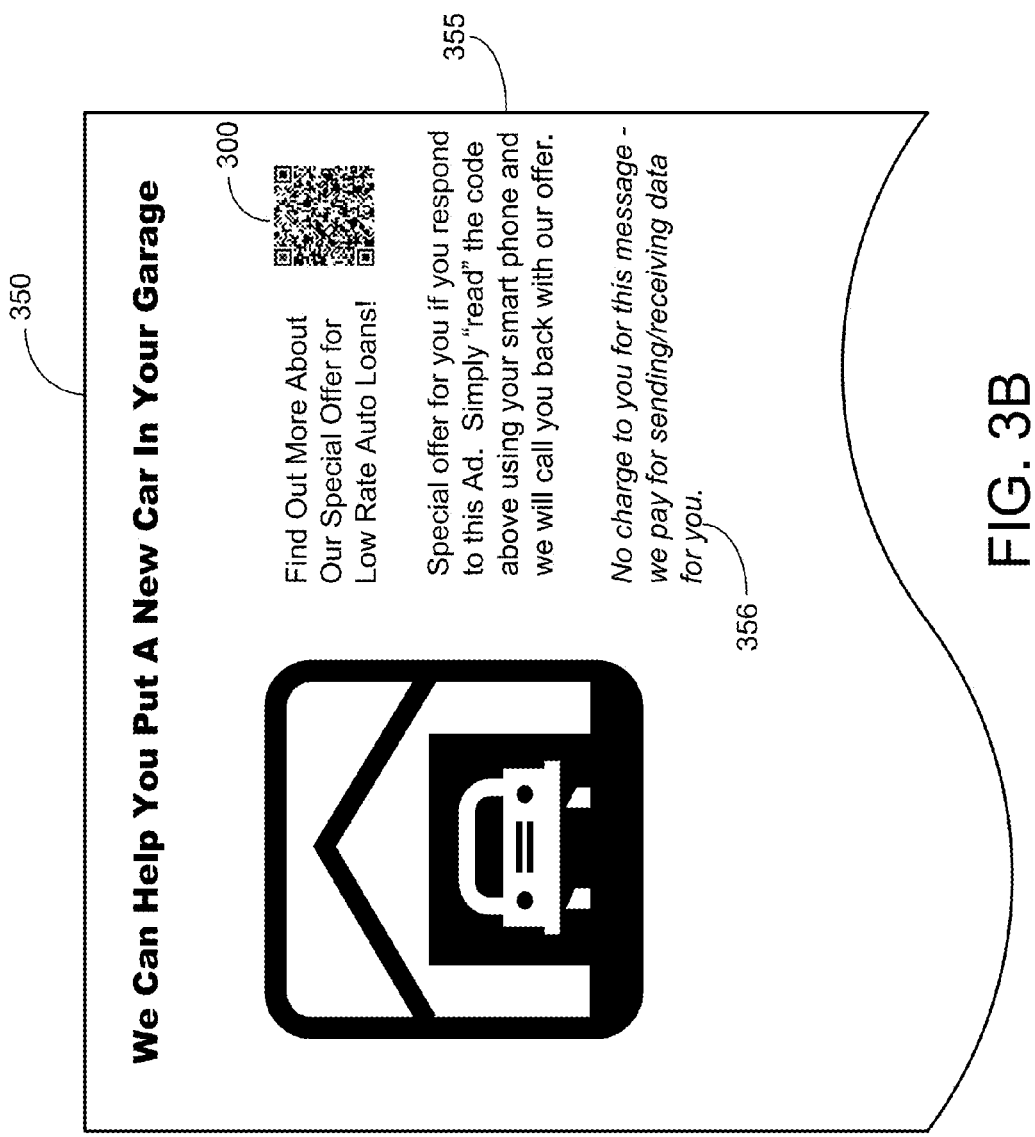
FIG. 3B shows one embodiment of a QR code used in an advertisement for a service.

FIG. 3B illustrates one embodiment for presenting a QR code 300. Specifically, FIG. 3B illustrates a QR code 300 presented in an advertisement 350 that may be in a variety of media forms, such as, for instance, a mailer, newspaper, magazine, or billboard. However, in other embodiments, the QR code 300 may be presented on a card, badge, or other handbill. Further, in particular embodiments, the QR code 300 may be presented using a display, such as on a video-billboard, television commercial, or computer display, or the QR code 300 may even be presented on a clothing article, such as a T-shirt.

Depending on the embodiment, the structure of the advertisement 350 may include a tag line 355 informing the reader that further information may be obtained by reading the QR code 300. However, as QR codes are becoming more popular, it may not be necessary to inform the reader that further information may be obtained by reading the QR code 300, as the user base may come to expect this. The tag line 325 may indicate what benefits may be realized by reading the QR code 300. In addition, the tag line 325 may include an incentive to motivate the reader to read the QR code 300. For example, the incentive may be, for example, a discount, prize, free accessory, promotional materials, trial, coupon, or any other conventional marketing incentive.

As noted above, in one embodiment, reading a QR code 300 may merely cause a text message to be displayed on the device without originating an electronic communication from the device. However, in other embodiments, a data communication or voice communication may be initiated. For example, reading the QR code 300 may result in a web page being accessed, a SMS message being sent, or a phone call being initiated.

Further, a user may be hesitant to read the QR code 300 because doing so may result in data usage or other charges to be incurred by the user. That is, even if the user has a tiered data plan, data usage may eventually result in increased data charges. Consequently, in particular embodiments, the provider of the advertisement (or the goods or services) may arrange for payment of the data charges associated with the data transfer to encourage the user to read the QR code 300 and follow through on the action. This can be done in a variety of ways, which are evident to those skilled in the art of wireless data transfer billing. For example, some carriers have announced mechanisms to allow a third party mobile application developer to pay for data transfer charges on behalf of a wireless subscriber as a means for encouraging the subscriber to access a particular web site. In other embodiments, the recipient of the SMS message (which often may be the call center) sent from the smart phone may be charged for the SMS message. Accordingly, various approaches are possible for ensuring the user is not charged for the SMS message.

Figure 3C:
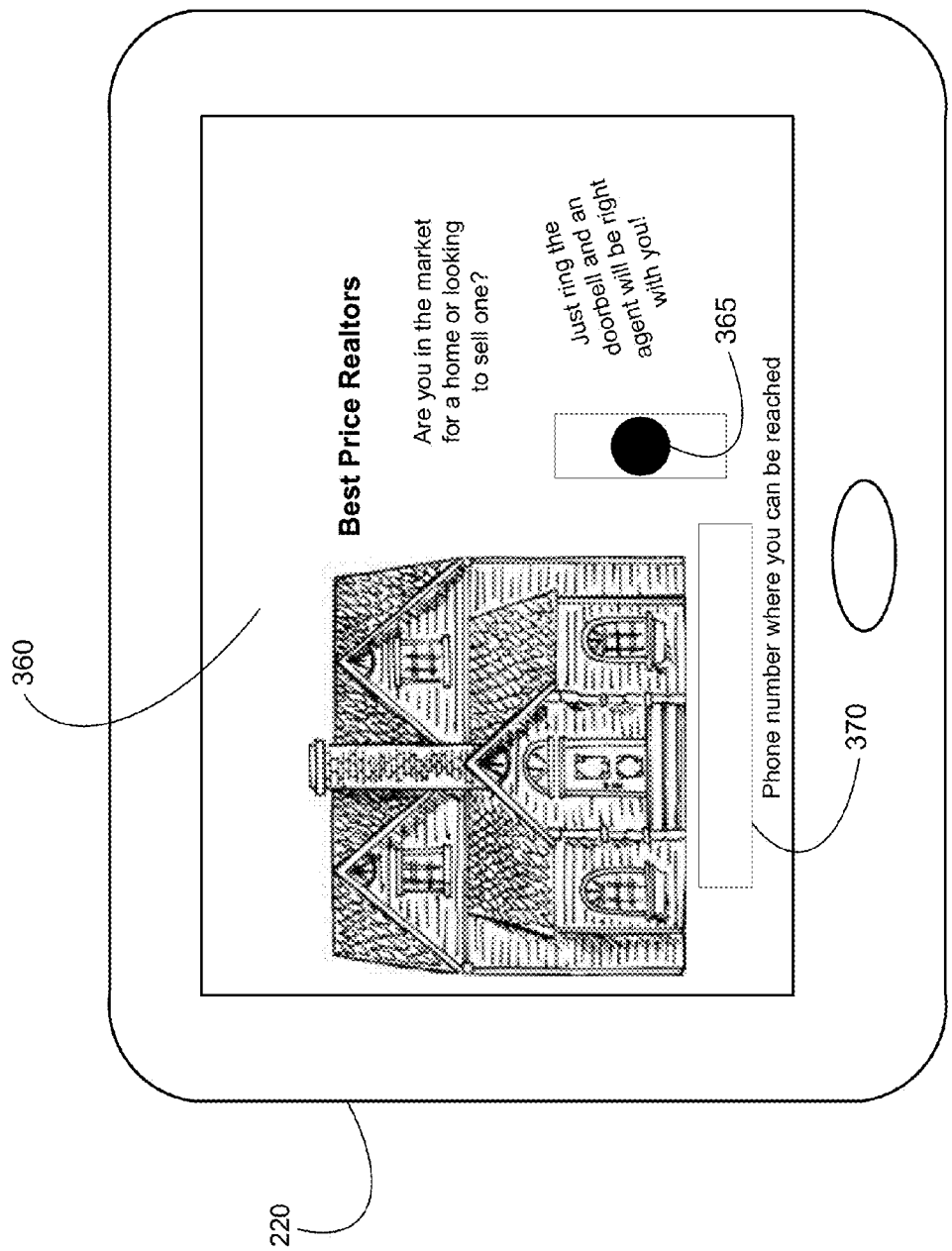
FIG. 3C shows one embodiment of a link used in an advertisement appearing in an electronic reading material.

Turning now to FIG. 3C, this figure provides an embodiment of using a link in electronic reading material to cause an action to occur similar to the actions described above with respect to QR codes 300 illustrated in the advertisement. In this particular embodiment, the electronic reading material may be a periodical, such as a magazine, downloaded to a subscriber's viewing device 220. In this example, the content of the periodical contains an advertisement 360 for "Best Price Realtors." The advertisement 360 informs the reader (e.g., subscriber) to "[j]ust ring the doorbell and an agent will be right with you!" In this instance, the doorbell is a link 365 found on the advertisement that may be selected by the reader to activate an action associated with the link. For example, similar to the QR codes 300 described above, the action may result in the initiation of some type of data and/or voice communication. Furthermore, in particular embodiments, the advertisement 360 may gather additional information from the reader such as a telephone number 370 the reader may be contacted at. As one of ordinary skill in the art can envision, similar to QR codes 300, the provider of the advertisement 360 (or the goods or services) may arrange for payment of the data charges associated with the communication (e.g., data transfer) to encourage the reader to select the link 365 and follow through on the action.

Various Communications Approaches

Depending on the embodiment, the actions performed and the data used in conjunction with a QR code or link may vary as a result of reading the QR code or activating the link. In general, any of the actions that may be initiated by a QR code could also be associated with a link. The following embodiments illustrate various approaches that can occur, but are not intended to be exhaustive, as those skilled in the art will recognize that variations are possible.

The process flow that a code reader in a mobile device and/or a reading device performs can be programmed in various ways, some of which are identified.

Figure 4A:
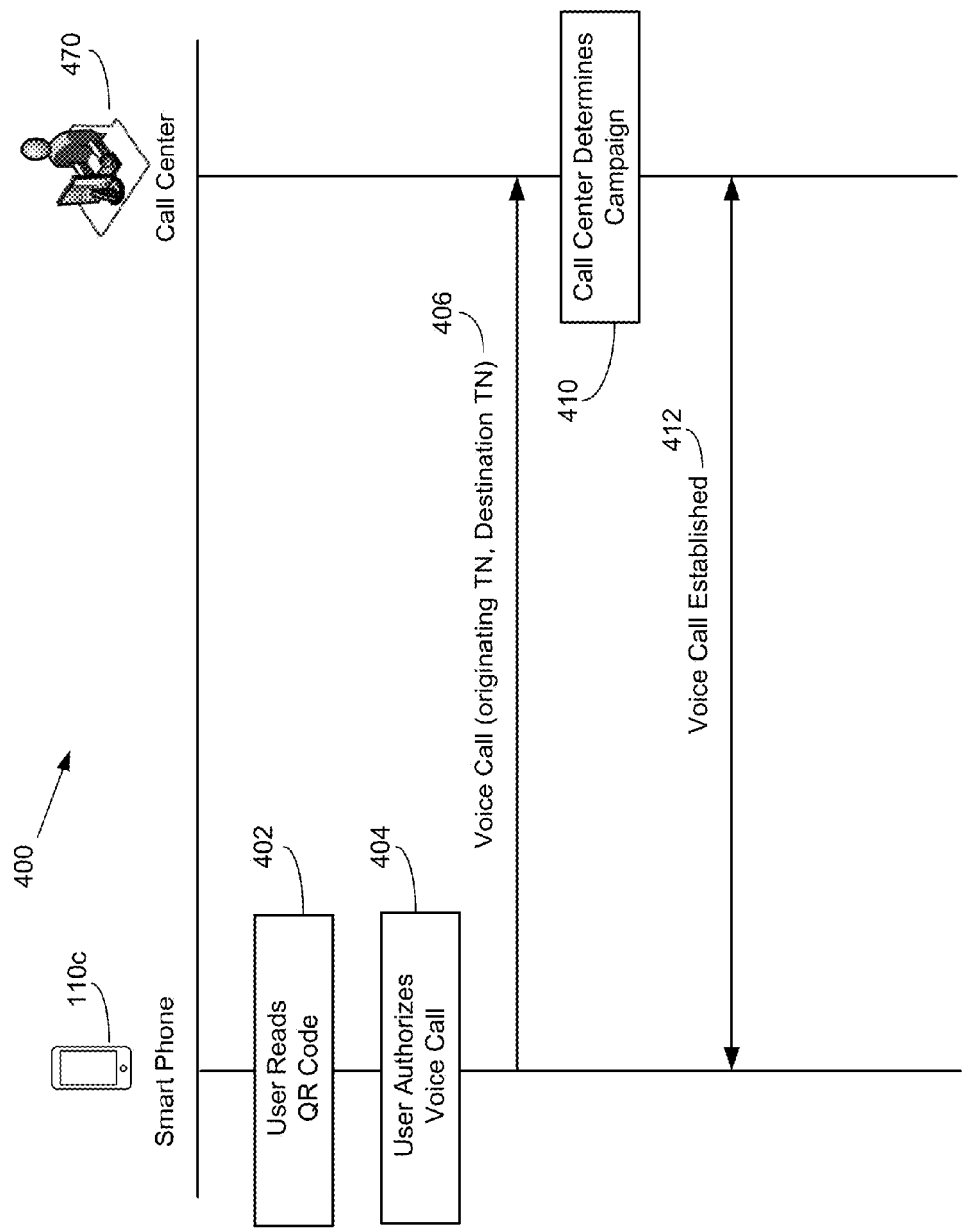

FIGS. 4A-4G show various embodiments of using a QR code or link within electronic reading material for contacting a call center. Turning to FIG. 4A first, a simplified diagram 400 is provided that shows some of the messages and processes that occur in and between a smart phone 110e and a call center 470 according to one embodiment. The call center 470 is diagrammatically illustrated using an icon.

The process begins in operation 402 when the user operates the smart phone to read a particular QR code. In some embodiments, this may occur based on the user viewing an advertisement which bears the QR code, and provides an incentive for the user to read the code. As a result of reading the code, the mobile phone is configured to originate a voice call to an indicated telephone number. In this particular embodiment, assuming the user's consent is requested and received in operation 404, the smart phone 110c originates the voice call as represented by messaging 406. For instance, the establishment of the voice call may be a telephone call using the appropriate wireless protocol for the smart phone (e.g., CDMA, GSM, etc.) While in other embodiments, the call may be a voice call initiated by a VoIP application, such as Skype®. In this particular example, the voice call setup messaging 406 is based on using the originating telephone number ("TN") of the mobile phone and the destination TN, which was provided by reading the QR code, and the call is set up to a call center.

In particular embodiments, additional information may be provided with the voice call setup messaging 406. For example, in some embodiments, user-to-user signaling allows user defined data (user-to-user information or "UUI") to be conveyed along with a call setup or during the call. Various wireless and wireline signaling protocols allow a limited amount of UUI to be transferred along with the establishment of the call. Depending on the embodiment, this information may be encoded in the QR code and populated by the QR code mobile application reader during call setup and/or may be provided by the user in response to prompts by the QR code mobile application reader. The user may not always know that UUI is being transferred along with the call establishment.

In operation 410, the call center determines the appropriate calling campaign after receiving the call. For instance, in particular embodiments, the call center may be receiving inbound calls for a variety of campaigns, and hence it is necessary for the call center to distinguish which campaign a particular received call is involved with. For example, in one embodiment, an initial screen display on the answering agent's workstation may be populated according to the type of campaign associated with the call and the initial screen display may provide the agent with scripts, product information, advertising campaign context, etc. for the type of calling campaign.

According to various embodiments, the call center may determine the calling campaign in different ways. For instance, the call center may identify the campaign based on the called telephone number (a.k.a. called number or destination telephone number). In these particular embodiments, the call is delivered with a called telephone number and by assigning a unique called telephone number for each campaign the call center uses the called telephone number to identify the appropriate campaign before the call is answered by the agent. Depending on the embodiment, the called telephone number may be a direct inward dial ("DID") telephone number in a NPA-NXX-XXXX format or a toll free number. In some instances, the called telephone number may also be referred to as "DNIS" (dialed number information service). In other embodiments, the call center may determine the campaign by using other information such as the UUI, which may be included in the call setup. For instance, the UUI may include a context code, advertising code, and/or other information that is uniquely associated with the campaign. Thus, depending on the particular embodiment, the call center may determine the campaign based on the called telephone number, the UUI, and/or other information conveyed along with or during the call. Once the campaign has been identified and an appropriate agent is selected to receive the call, the voice call is established using messaging 412. As a result, the call center agent is now engaged in a voice call with the user.

Figure 4B:
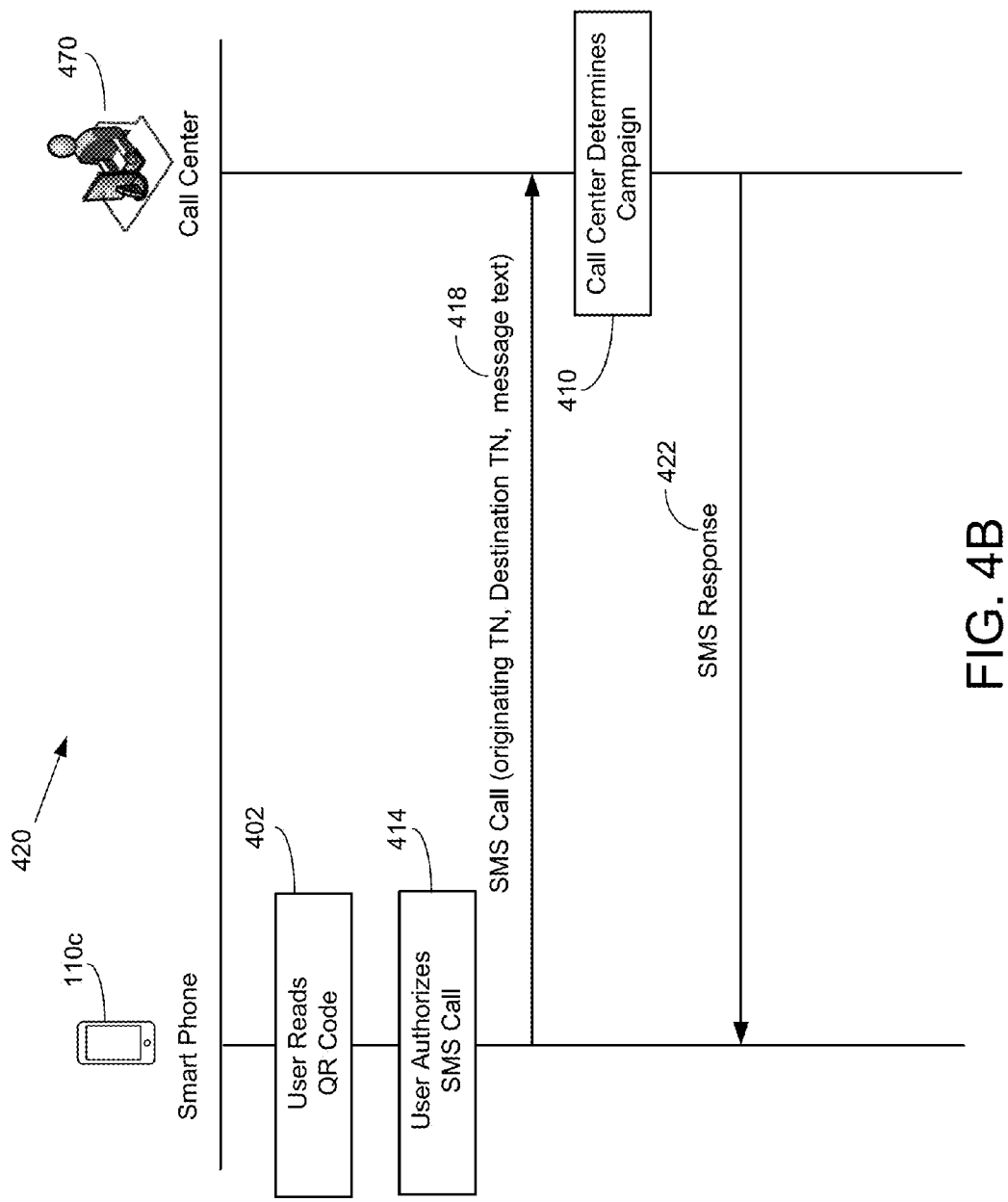

FIG. 4B illustrates another simplified diagram 420 according to another embodiment, however this time the process involves one or more SMS messages. In FIG. 4B, the process begins with the user reading the QR code in operation 402. In this particular embodiment, reading the QR code causes the mobile phone to formulate a SMS message to a destination address with the message text portion pre-populated. Once the user has authorized the SMS messaging in operation 414, the SMS messaging 418 is transmitted to the call center.

The SMS messaging 418 may comprise the originating address (which may be in the form of a TN or a short code), the destination address (which may be in the form of a TN), and/or the message text. In particular instances, the content of the message text may be altered by the user prior to sending the SMS message, but in many instances, the user is presumed to send the message text in an unaltered form.

In operation 410, the call center 470 determines which campaign the SMS message is associated with. In particular embodiments, the call center 470 may accomplish this task by examining the destination TN, which may be uniquely associated with the campaign. In other embodiments, the call center 470 may accomplish this task by examining the message text content, which may uniquely identify the campaign. For the example, the call center 470 may use the text syntax, the presence of a context code, and/or other identifier to identify the campaign. It should be noted that if the message text content identifies the campaign, then the same destination TN can be used for other campaigns in some embodiments.

Once the call center 470 has identified the campaign, the call center 470 may respond with SMS response messaging 422. The response message 422 may confirm receipt, provide the requested information, and/or provide a time for scheduling a voice call back from the call center 470, etc. For example, the SMS response message 422 may request whether the user desired an immediate voice call back from an agent.

FIG. 4C illustrates another simplified diagram 430 according to another embodiment, however this time the process involves one or more SMS messages that result in a voice call established between the user and the call center 470. The process begins with operation 402 with the user reading the QR code. For this particular embodiment, the QR code causes a SMS message to be populated with message text and a destination TN encoded by the QR code. In operation 414, the user authorizes the sending of the SMS message that leads to the SMS messaging 432. In this particular instance, the SMS message includes the originating TN, the destination TN, and the message text. Further, in this particular instance, the message text requests a voice call back from the call center.

In operation 410, similar to the processes already described, the call center 470 determines the campaign, for example, by examining the destination address and/or the message text content. Once the call center 470 determines the appropriate campaign, the call center 470 selects an agent and a voice call is setup in messaging 434 to the smart phone 110c. Presuming the user answers, then a voice call is established in messaging 436.

In this particular embodiment, the request for information in a first format, e.g., a text message, results in a follow up communication in a second format, e.g., a voice call. Such an embodiment allows the user to have the convenience of personalized contact with an agent and allows for a more rapid and flexible exchange of information.

Figure 4D:
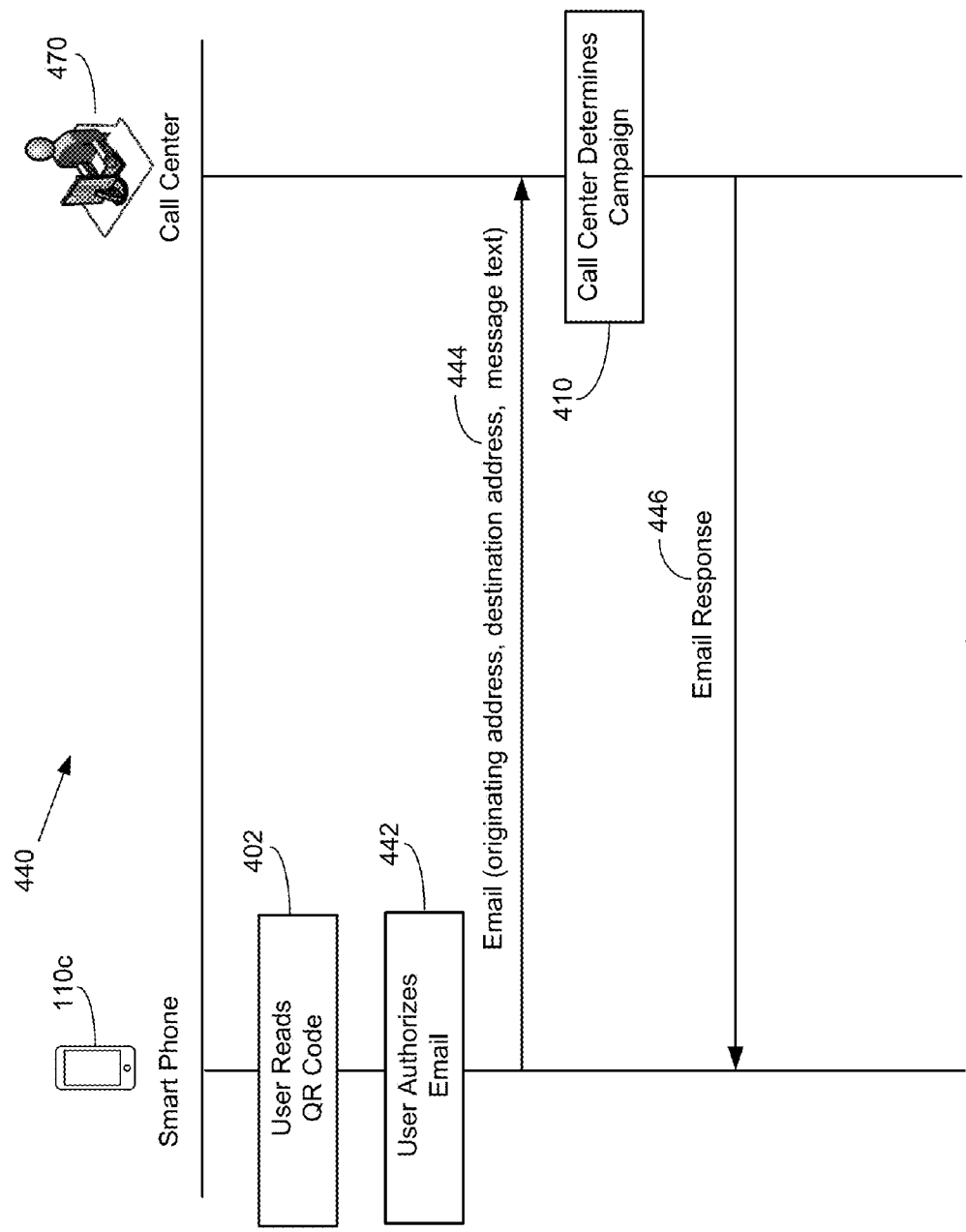

FIG. 4D illustrates yet another simplified diagram 440 of another embodiment, however this time the process involves one or more email messages that result in an email response from the call center. The process begins with operation 402 with the user reading the QR code and the QR code causing an email message to be populated with message text and a destination address encoded by the QR code. In operation 442, the user authorizes the sending of the email message that leads to the email messaging 444. In this particular instance, the email message includes the originating address, the destination address, and the message text. Further, in this particular instance, the message text may or may not request an email response.

In operation 410, the call center 470 determines the campaign, for example, by examining the destination address and/or the message text. Once the call center 470 determines the appropriate campaign, an email message is initiated in messaging 446 to the smart phone 110c.

In this particular embodiment, the request for information in a first format, e.g., an email message, results in a follow up communication in the same format. In other embodiments, however, the user could include his or her telephone number in the email message so as to have a voice call returned from the call center 470. Such a configuration allows the user to have the convenience of personalized contact with an agent and allows for a more rapid and flexible exchange of information.

Figure 4E:
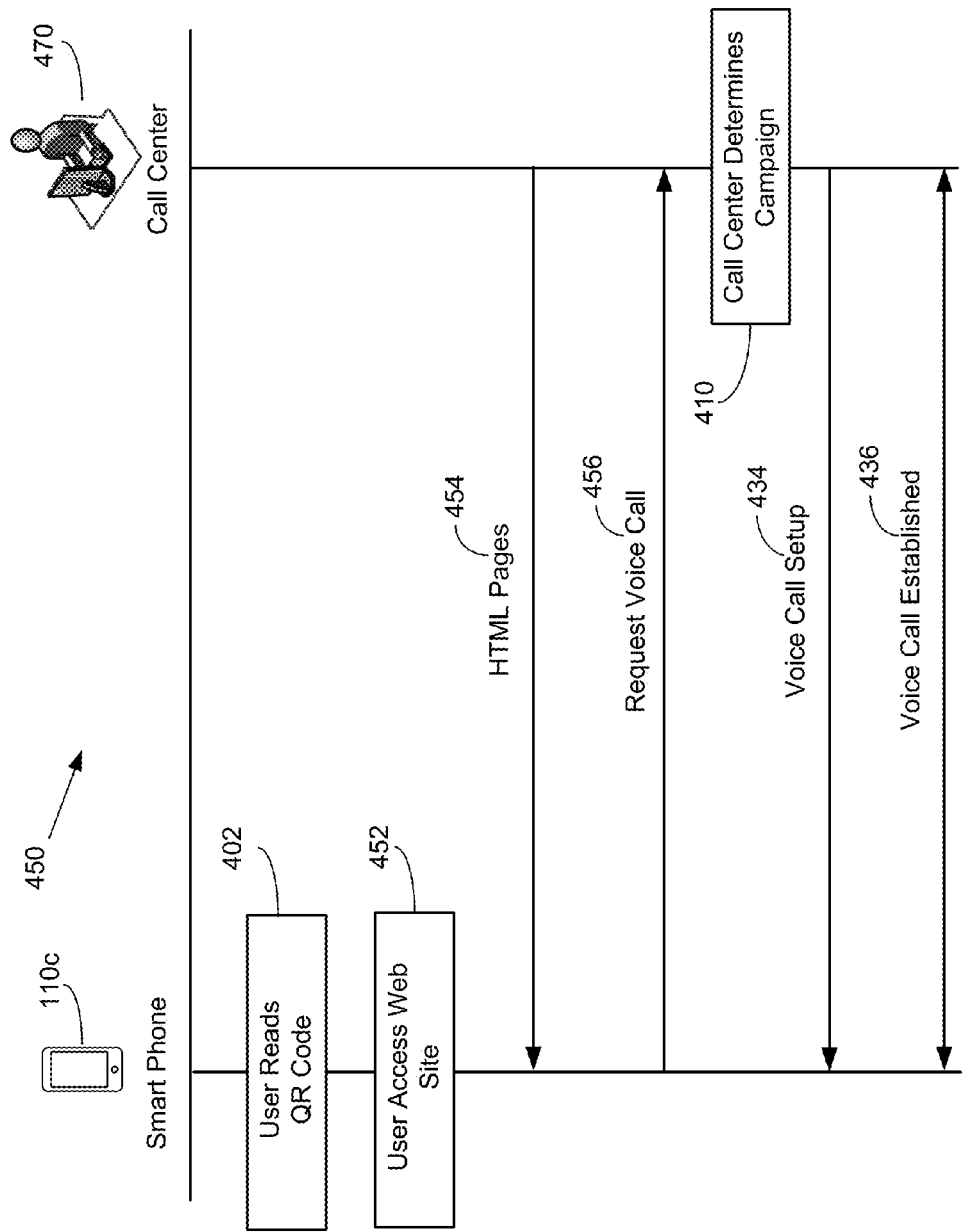

FIG. 4E illustrates yet another simplified diagram 450 according to another embodiment, however this time the process involves accessing a web site that results in a voice call from the call center 470. The process begins with operation 402 with the user reading the QR code. The QR code causes a URL or other web address to be accessed in operation 452 and results in HTML based web pages being downloaded from the call center 470 to the smart phone 110c, in operation 454.

As a result, the user may access one or more of the web pages to request a voice call in messaging 456. In some instances, this may require the user to provide a telephone number and explicitly request the call back. In operation 410, the call center 470 determines the campaign, for example, by examining the accessed web address and/or information selected from one or more web pages. Once the call center 470 determines the appropriate campaign, the call center 470 then selects an agent and voice call setup messaging 434 is sent to the smart phone 110c. In messaging 436, the voice call between the user and the agent is established.

FIG. 4F illustrates yet another simplified diagram 460 according to another embodiment, however this time the process involves displaying a text message to the user to prompt the user to initiate a call to a call center. In particular instances, the text message may also include instructions, for example, for entering a code or other information allowing the call center 470 to identify a context for the communication.

The process begins with operation 402 with the user reading the QR code that causes a text message to be displayed on the smart phone's display 462. The message can be, for example, instructions to call a toll free number and potentially enter information as requested. In messaging 464, the call is initiated to the destination TN indicated in the text.

Once the call center 470 determines the appropriate campaign in operation 410, the call center 470 then selects an agent and a voice call is established in messaging 436 with the smart phone 110c. In this embodiment, the establishment of the voice call is under the direct control of the user. Further, in particular instances, the voice call may be established to an IVR, instead of directly to an agent, and the user may be prompted to enter a code, or further information. For example, if an agent is not available, the IVR may be used to schedule a call back time for the indicated campaign as identified by the user.

Figure 4G:
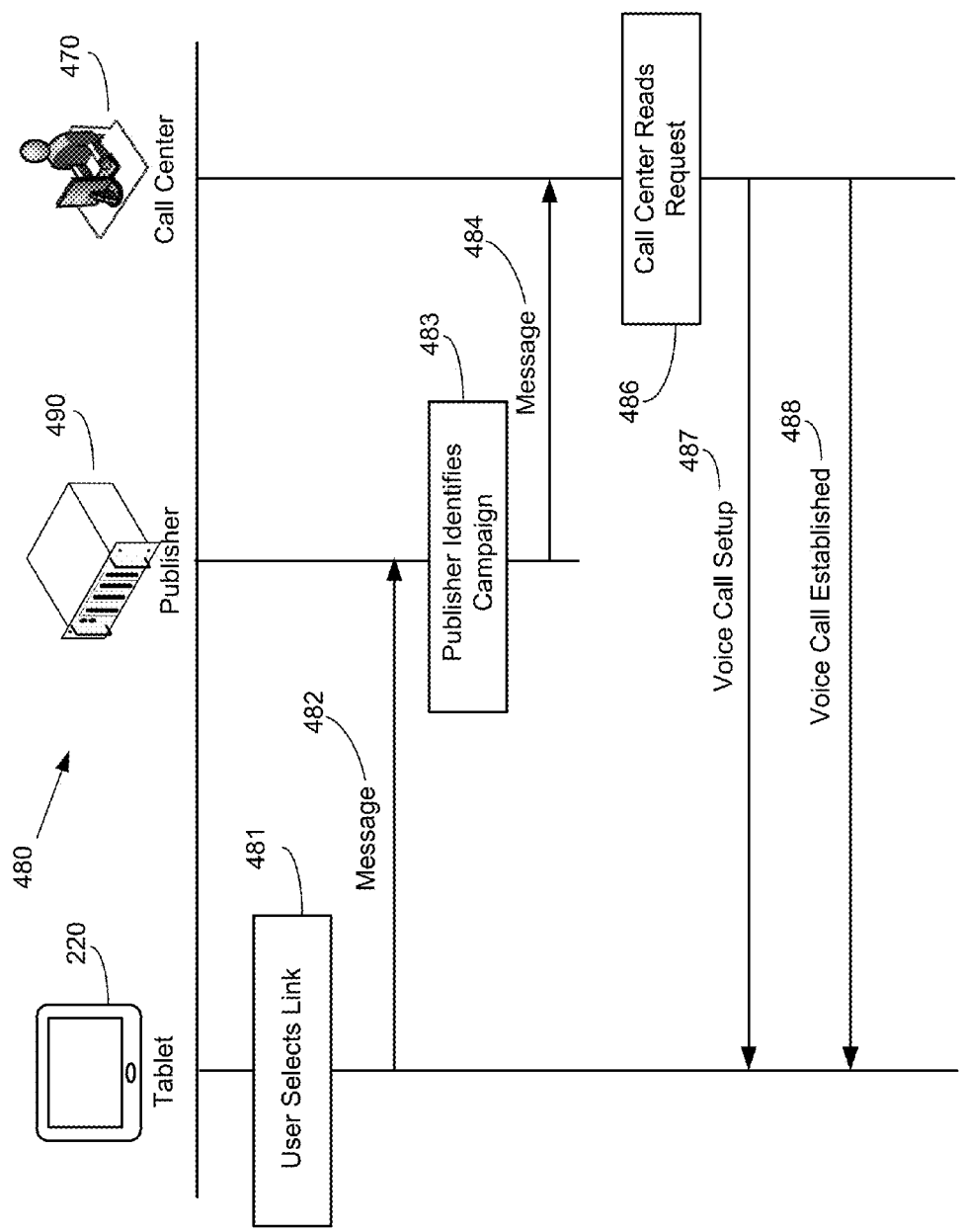

FIG. 4G illustrates a simplified diagram 480 according to an embodiment that utilizes a link embedded in electronic reading material. As previously mentioned, the electronic reading material can be, for example, a digitized book, news print, or periodical. In this instance, an advertisement is placed in the electronic reading material that contains a link that can be selected by the reader. Thus, the process begins with the reader viewing the advertisement and selecting the embedded link in the advertisement in operation 481.

Similar to QR codes described above, in various embodiments, the selection of the link may cause a number of different actions to occur. In this particular instance, the selection of the link causes messaging 482 to occur to the publisher 490 of the electronic reading material. Depending on the embodiment, a screen may first appear on the reader's device 220 prior to the message being sent to the publisher 490. For instance, in one embodiment, a screen may appear on the reader's device 220 requesting the reader to enter information on his or her subscription (e.g., account username and/or password) with the publisher 490. In another embodiment, the user may be prompted for authorization for the publisher 490 to use information about the user. Accordingly, this information may be sent along in the body of the message to the publisher 490. Further, in particular embodiments, the advertisement with the embedded link may also request information from the reader that may be included in the body of the message. For example, the advertisement may request a telephone number at which the reader may be reached. Those of ordinary skill in the art can envision several pieces of information that may be included along with the message 482 sent to the publisher 490 in light of this disclosure.

Upon receiving the messaging 482, the publisher 490 identifies the campaign associated with the messaging 482 in operation 483. Similar to QR codes, the publisher 490 may identify the campaign in a variety of different ways according to various embodiments. For instance, in particular embodiments, the publisher 490 may examine text syntax, the presence of a context code, and/or other identifiers contained in the message 482 that uniquely identifies the campaign and/or the reader. Further, in particular embodiments, the publisher 490 may also retrieve information to aid in identifying the campaign.

In addition, depending on the embodiment, the publisher 490 may also retrieve additional information on the reader not included in the message. For example, in one embodiment, the publisher may retrieve contact information on the reader based on the reader's account information provided in the message. As a result, the contact information may then be forwarded to a call center 470 so that the contact information may be used by the call center 470 to contact the reader.

Upon identifying the call campaign, the publisher 490 assembles a message request 484 that is sent in messaging 484 to the call center 470 associated with the identified call campaign. In general, the message request 484 is associated with an expected type of response to the reader. For example, in this particular embodiment, the message request 484 includes a request for the call center 470 to place a call to the reader to provide additional information and/or assistance with respect to the product or service associated with the advertisement viewed in the electronic reading material.

In particular embodiments, the publisher 490 may include a number of different types of information in the message to the call center 470 to help the call center 470 contact the reader. For example, the publisher 490 may include contact information retrieved for the reader and/or include a contact (e.g., telephone number) provided by the reader in the message sent to the publisher 490.

Upon receiving the message 484, the call center 470 processes the message request in operation 486. Depending on the embodiment and based on the information provided in the message request, the call center 470 may need to determine the campaign associated with the request. Further, the call center 470 may need to identify additional information associated with the call campaign such as, for example, information to populate a display screen on an agent's workstation that may provide the agent with scripts, product information, advertising campaign context, etc. for the type of campaign.

Typically, in many embodiments, the request message 484 sent by the publisher 490 will include the information needed to contact the reader. In some embodiments the publisher 490 may store information regarding the reader (e.g., the reader user may be a subscriber of the publisher 490). However, in some instances, the call center 470 may also retrieve contact information associated with the reader based on information provided in the request message 484 sent from the publisher 490 to the call center 470.

Once the call center 470 reads the message request 484 in operation 486 the call center 470 selects an appropriate agent and a voice call is setup in messaging 487 to the reader. Depending on the embodiment and/or circumstances of the reader, the voice call may be placed to the reader's device 220 used to read the electronic reading material or to a separate device. For example, the user (a.k.a. as an "e-reader" or simply "reader") may be using an iPad® to read the electronic reading material which may not have a phone capability. In this instance, the call center 470 may place the voice call to another device of the user, such as the user's cell phone. In the embodiment show, the device 220 is presumed to have a phone capability, and a voice call is established in messaging 488 between the agent and the device 220.

In this particular embodiment, the request for information from the user in a first format, e.g., a text message, results in a follow up communication in a second format, e.g., a voice call. Thus, similar to the QC codes, such an embodiment allows the user to have the convenience of personalized contact with an agent and allows for a more rapid and flexible exchange of information.

It should be noted that although process diagrams are not provided for other forms of communication using embedded links in electronic reading material, such other forms may be utilized in similar fashions as those used with QR codes. For instance, similar to QR codes, activation of links embedded in electronic reading material in various embodiments can lead to the call center sending users SMS messages and/or emails, having users access a web site that results in voice calls with the call center, and/or having text messages prompt users to initiate calls to the call center. Thus, the modes of communications used by the various parties (e.g., users, publisher 490, and call center 470) may differ depending on the embodiment.

Figure 5:
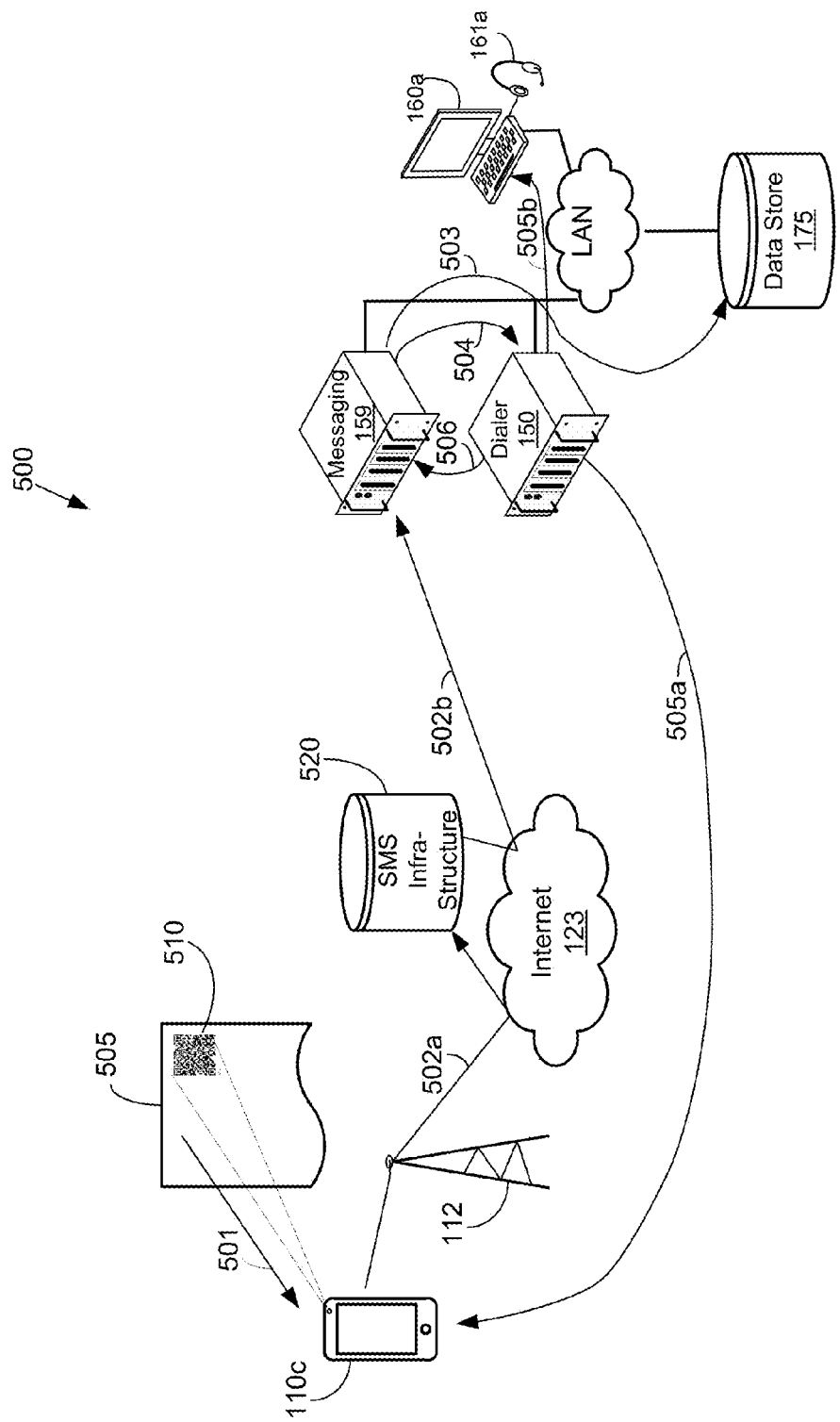
FIG. 5 shows one embodiment of a message flow that involves sending a SMS message from a smart phone to a call center and receiving a return call from the call center.

An illustration of the message flow for one of the above embodiments involving the use of a QR code 510 is shown in FIG. 5. Specifically, FIG. 5 shows an embodiment of a message flow 500 that involves sending a SMS message from a smart phone 110c to a call center after reading a QR code 510 and receiving in response a return call from the call center. As shown, an advertisement 505 is distributed in some manner that displays a QR code 510. For purposes of illustration, this could be an advertisement in a magazine.

The QR code 510 is read by the smart phone 110c as illustrated by messaging 501 and the smart phone 110c originates a SMS message 502a that is conveyed by a mobile service provider 112. The message 502a may be conveyed by the Internet 123 to various SMS infrastructure 520, which may involve gateways, servers, data stores, etc. In some embodiments, the infrastructure 520 may involve a gateway that performs reverse billing of the SMS messages. That is, the gateway may record the number of SMS messages sent to the call center, and bill the call center for this traffic. In another embodiment, the gateway may convert the digital text message from a SMS message 502a format to an email format, which is then forwarded to the call center. In converting the digital text message to a particular format, the information in the original SMS message 502a is typically retained. For instance, in particular embodiments, the message body, the SMS destination address, and/or the SMS originating address are all retained as part of the contents of the email message. Thus, the SMS message 502a can be delivered in whole using another format, such as an email format. The email message 502b may be forwarded to a messaging server 159 in the call center. At this point, the email message 502b may be considered as sent from the smart phone to the call center.

At the call center, depending on the embodiment, a number of operations may occur upon receipt of the message 502b. These may occur in different order. For purposes of illustration, the following order of events occurs. First, the messaging server 159 provides a copy of the email message 502b to the data store 175 in message 503. In particular instances, the data store 175 may be a database (or a plurality of databases) that retains a copy for various purposes. For example, a copy may be retained for purposes of recording potential customer contacts and/or a copy may be stored to demonstrate that the user provided electronic consent for receiving a subsequent telemarketing oriented communication. The electronic consent infrastructure may be that as disclosed in the above referenced patent applications.

Next, the messaging server 159 informs a dialer 150 that a call back should be scheduled or should occur as soon as possible to the user in messaging 504. Depending on the embodiment, the dialer 150 may employ various dialing techniques, and may be a fully automated process, or may be a manual, or semi-manual process, and involve an agent. In this particular embodiment, an agent is involved in the call back.

The dialer 150 identifies the calling campaign based on the received email message 502b and retrieves information associated with the calling campaign. Depending on the embodiment, this information may include agent instructions, advertising related product data, etc. Further, the contents of the received email message 502b may be displayed to the agent prior to call back origination. Doing so may allow the agent to readily determine if the user had altered the text of the pre-populated message body. For example, if the message body indicates "Please call me about your new line up of 2012 hybrid cars", the user may have edited the text to state, for instance, "Please call me about your new line up of 2012 hybrid cars—especially the SUV model." An indication of any altered text can be highlighted or otherwise indicated by the call center systems to the agent. This allows the agent to easily identify any customized user requests.

Consequently, the dialer 150 establishes a call leg using messaging 505*b* with a selected agent's workstation 160*a*, 161*a*. Contemporaneously (but not necessarily simultaneously), the dialer 150 may establish a call leg to the user in messaging 505*a*. Assuming that the user answers, the dialer 150 bridges, joins, conferences or otherwise causes the two call legs to be connected. Thus, the agent is connected via a voice call to the user. In some embodiments, the dialer 150 may report 506 the successful status of the call to the messaging server 159, and/or to the data store 175. As noted previously, this voice call could be a VoIP type of voice call.

Figure 6:
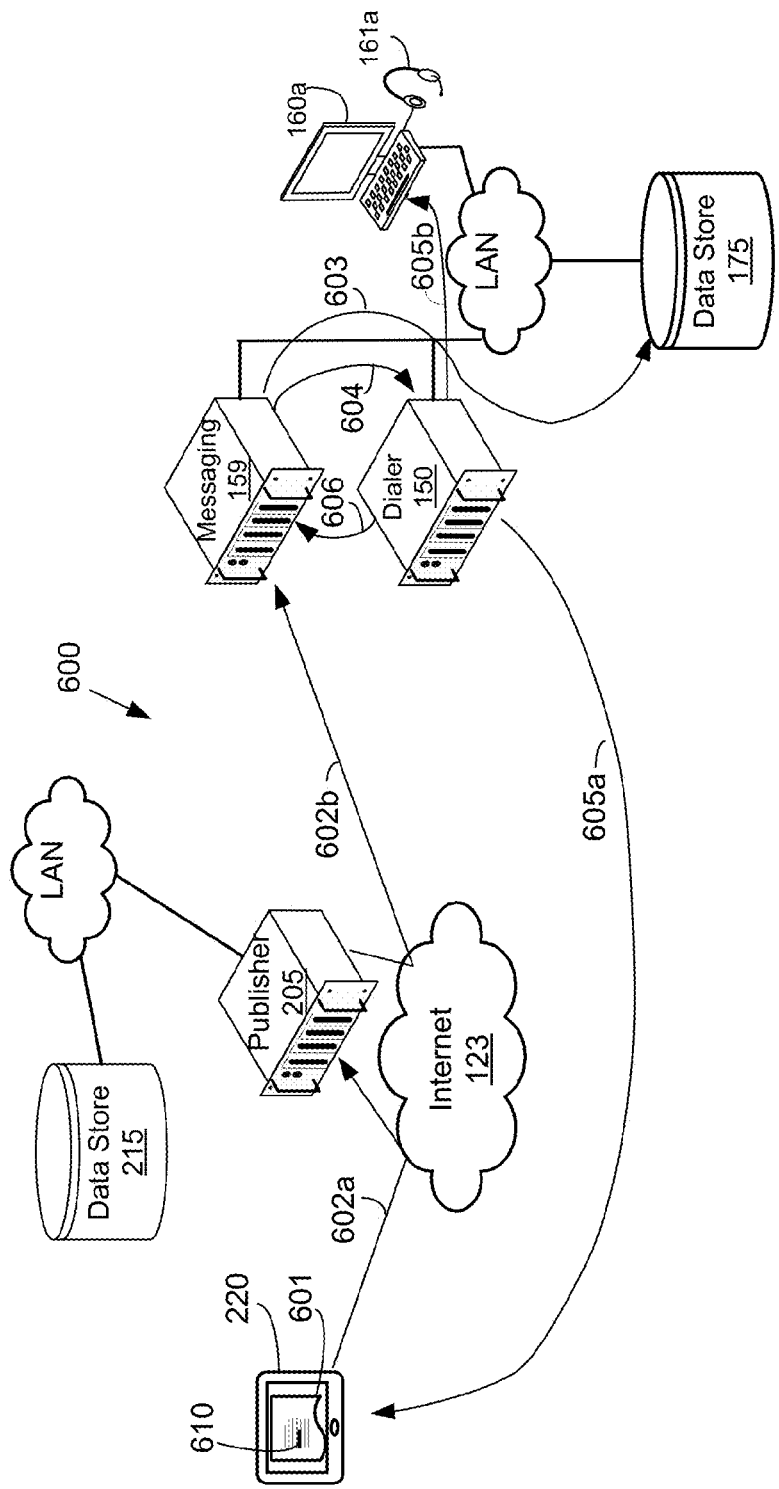
FIG. 6 shows one embodiment of a message flow that involves sending a message from activating a link to a call center and receiving a return call from the call center.

Similarly, a more detailed message flow for one of the above embodiments involving the use of an embedded link in electronic reading material is shown in FIG. 6. Specifically, FIG. 6 shows an embodiment of a message flow 600 that involves sending a message from a reading device 220 to a publisher server 205, and subsequently a call center after activating a link 610 embedded in electronic reading material, and receiving in response a return call 605*a* from the call center. Specifically, an advertisement 601 containing an embedded link 610 is placed in electronic reading material, such as an issue of a magazine, and the material is made available by the publisher to its subscribers. A particular subscriber selects the particular issue of the magazine by operating the device 220, downloads the issue to his or her reading device 220, and begins to view the issue on the device 220.

During the viewing of the issue of the magazine, the advertisement 601 is encountered and the subscriber selects the link 610 embedded in the advertisement 601 to request a call from a call center agent to receive additional information on the product being promoted in the advertisement 601. As a result, the reading device 220 originates a message 602*a* that is conveyed over the Internet 123 to the publisher's system 205. The message may be in various forms, including text messages, email, facsimile, etc. The publisher's system 205 may comprise a series of gateways, servers, data stores, and in some embodiments, the system 205 may involve a gateway (not shown) that performs reverse billing of messages sent to the publisher and/or the call center. That is, the gateway may record the number of messages sent to the publisher and/or the call center from various users, and bill the call center for this traffic. Depending on the embodiment, the gateway may convert the digital message 602*a* received as a result of the activation of the link 610 into a different format to send to the call center, such as to a SMS message format and/or an email format. In this manner, the user of the device 220 does not have to pay messages charges for responding to the advertisement links.

Similar to the QR code process described above, when converting the message 602*a* to a particular format, the information in the original message 602*a* may be retained in various embodiments. For instance, in particular embodiments, the message body received from the subscriber's device 220 is retained as part of the contents of the SMS or email message 602*b*. Although, in a number of embodiments, additional information, such as contact information for a communication device and/or email address for the subscriber, may be added to the contents of the SMS or email message 602*b*. In other embodiments, the publisher may add information about the subscriber based on subscriber records maintained by the publisher server 205. Thus, the original message 602*a* can be delivered in whole using another format, such as a SMS or email format. The SMS or email message 602*b* may be forwarded to a messaging server 159 in the call center. At this point, the SMS or email message 602*b* may be considered as sent from a device 220 of the subscriber directly to the call center. That is, in particular embodiments, the SMS or email message 602*b* received by the call center is treated in a similar fashion as other communications typically received by the call center.

At the call center, depending on the embodiment, a number of operations may occur and these may occur in different order than disclosed herein. However, for purposes of illustration, the following order of events occurs similar to the events described above with respect to originating messages from reading a QR code. First, the messaging server 159 provides a copy of the SMS or email message 602*b* to the data store 175 in message 603. In particular instances, the data store 175 may be a database (or a plurality of databases) that retains a copy for various purposes. For example, a copy may be retained for purposes of recording potential customer contacts and/or a copy may be stored to demonstrate that the user provided electronic consent for receiving a subsequent telemarketing oriented communication.

Next, the messaging server 159 informs a dialer 150 that a call back should be scheduled or should occur as soon as possible to the subscriber on the device identified in the message 602*b* in messaging 604. This could be the device 220 or another device (such as a smart phone or wireline phone) associated with the user. Depending on the embodiment, the dialer 150 may employ various dialing techniques, and may be a fully automated process, or may in whole or in part a manual process, and involve an agent. In this particular embodiment, an agent is involved in the call back.

The dialer 150 identifies the calling campaign based on the received SMS or email message 602*b* and retrieves information associated with the calling campaign. Depending on the embodiment, this information may include agent instructions, advertising related product data, etc. Further, the contents of the received message 602*b* may be displayed to the agent. Doing so may allow the agent to readily determine if the user had altered the text of a pre-populated message body.

Consequently, the dialer 150 establishes a call leg using messaging 605*b* with a selected agent's workstation 160*a*, 161*a*. Contemporaneously (but not necessarily simultaneously), the dialer 150 may establish a call leg to the subscriber in messaging 605*a*. Assuming that the subscriber answers, the dialer 150 bridges, joins, conferences or otherwise causes the two call legs to be connected. Thus, the agent is connected via a voice call to the subscriber. In some embodiments, the dialer 150 may report 606 the successful status of the call to the messaging server 159, and/or to the data store 175.

Figure 7A:
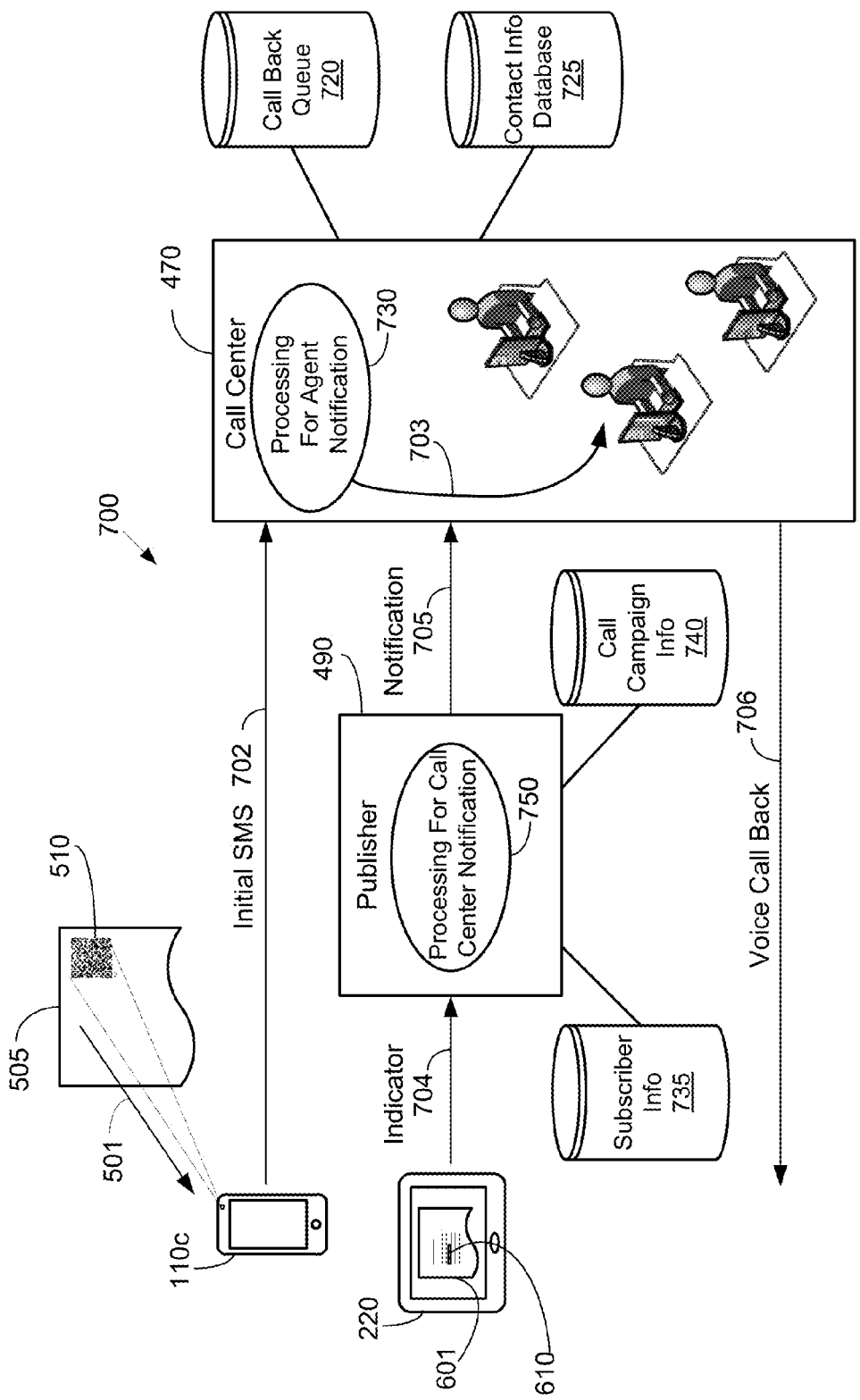
FIGS. 7A-7B show various embodiments of a call center responding to a communication generated by a user using a developed technology.

FIG. 7A expands on a variation of the messaging shown in FIGS. 5 and 6. FIG. 7A shows one embodiment 700 of a call center responding to a SMS communication generated by a smart phone 110*c* reading a QR code 510 or a subscriber activating a link embedded 610 in electronic reading material, and illustrates additional processing that may occur in the publisher 490 and the call center 470. FIG. 7A abstracts the publisher 490 and call center 470 using icons, and those skilled in the art will be able to map this to further detail in conjunction using FIGS. 1 and 2 or other publisher and call center architectures.

In FIG. 7A, the process begins with the smart phone 110c reading the advertisement 505 with the QR code 510 as depicted by operation 501 or the subscriber activating the link 610 embedded in an advertisement 601 in the electronic reading material on a reading device 220. As a result, a SMS message in operation 702 is sent to the call center 470 or an indicator message 704 is sent to the publisher 490 of the electronic reading material.

In the case of the indicator message being sent to the publisher 490, a program module 750 comprising instructions executed by a processor analyzes the indicator message. From the analysis, the program module 750 first determines the subscriber who has activated the link 610. Depending on the embodiment, the program module 750 may carry out this task by analyzing information contained within the message body of the indicator message. Furthermore, the program module 750 may retrieve additional information about the subscriber from a subscriber information database 735. For example, in particular embodiments, the program module may query the subscriber information database 735 to retrieve contact information for the subscriber to pass along to the call center 470.

Further, in particular embodiments, the program module 750 determines the call campaign associated with the indicator message. Similar to ascertaining the subscriber, the program module 750 may ascertain the campaign by analyzing information contained within the message body of the indicator message. For instance, in one embodiment, the message body contains a campaign identifier that the program module 750 uses to query a call campaign information database 740. The information retrieved from the call campaign information database 740 may contain a number of different information related to the associated campaign.

For example, the information stored in the call campaign information database 740 may inform the publisher 490 which call center 470 should be notified of the subscriber's actions. There may be a plurality of call centers 470 (only a single call center is shown in FIG. 7A) located in various time zones or regions, and based on the origination of the initial indicator message 704 (or other factors), the publisher 490 may select one particular call center to send the notification 705 to. There may be a plurality of advertisements 505 or 601 that the publisher 490 may direct to various call centers 470 based on the advertising content. If the advertisement was for a particular brand of automobile, then the automobile manufacturer may require any call backs occur from a particular call center, e.g., a corporate owned call center.

The notification message 705 may involve an application programming interface to the call processing computers in the call centers. Thus, the computer processing devices in the publisher 490 may be closed coupled with the computer processing devices in the call center 470.

In various embodiments, once the program module 750 has identified the subscriber and the associated call campaign, the program module 750 constructs and sends a notification message in operation 705 to the appropriate call center 470. Depending on the embodiment, the notification message may take on a number of different formats such as, for example, SMS message or email format. As a result, the call center 470 in various embodiments can treat the notification message like any other type of inbound communication that the call center 470 normally receives. Thus, in this particular instance, the program module 750 constructs the notification message as a SMS message and sends the SMS message to the call center 470.

Once received at the call center, a program module 730 comprising instructions executed by a processor within the call center analyzes the SMS message. For instance, in particular embodiments, the program module 730 may analyze the SMS message to ascertain the campaign associated with the SMS message. For example, in one embodiment, the program module 730 may ascertain the campaign by mapping a destination address found in the body of the SMS message with a campaign and/or by determining a campaign identifier in a look up table stored in memory. The program module 730 may also determine a set of agents that are trained for that campaign, and select one of the agents that is available to conduct the call back call. This is indicated by operation 703 in which the appropriate agent is notified of the number to call back.

Contemporaneously, in various embodiments, the call center 470 may record the incoming SMS message in a contact information database 725. The database 725 may be owned and operated by the call center 470, or may controlled by a third party. This data may be used, for example, to build a list of potential customers, analyze campaign effectiveness, etc. Another database that may also be utilized during the process 700 is a call back queue 720, which represents the list of users that are to receive a call back.

Unlike other types of call backs, the priority of initiating a call back may vary based on the initial form of contact from the user. For example, SMS messaging implies a certain level of urgency based on its real-time nature. Thus, an incoming communication originating from a user reading a QR code 510 or subscriber activating an embedded link 610 that results in an SMS message may be provided the highest (or a higher priority) in the call back queue 720 relative to other call backs indicated in the queue 720. In contrast, an incoming communication that is an email message may not imply the same level of urgency and may be provided a lower priority in the call back queue 720 relative to a SMS message. However, in other embodiments, an email message and SMS message may be given the same priority. Finally, once the SMS message reaches the proper position in the queue 720, the selected agent calls back the user or subscriber in operation 706.

It is possible that various teams of agents will be allocated to a particular queue for performing call backs, where an advertising campaign is associated with a particular team of agents. Thus, agents skilled or knowledgeable about a particular product (as featured in an advertisement) may be selected for performing the callback.

Figure 7B:
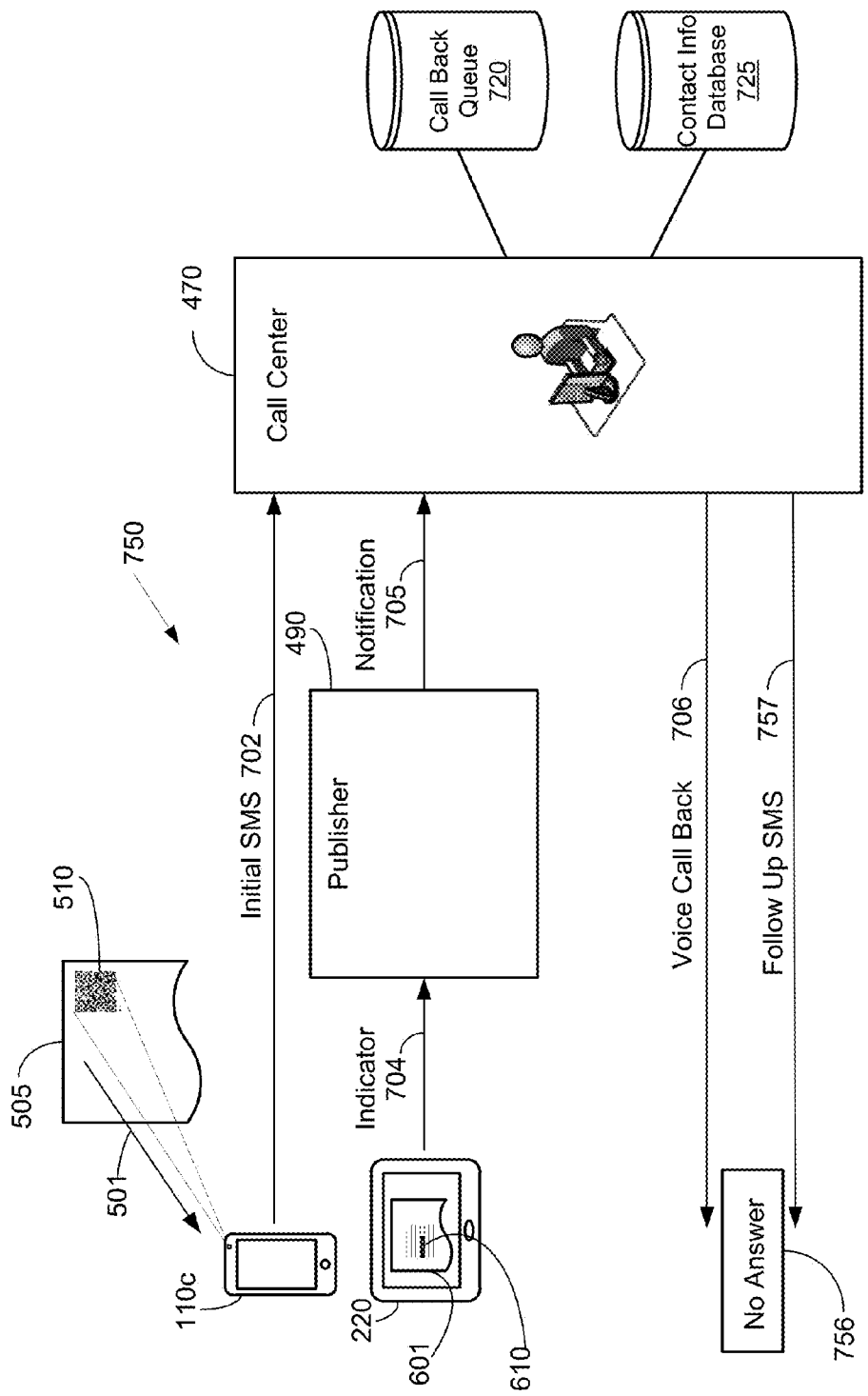

FIG. 7B illustrates a variation that can occur, based on FIG. 7A. FIG. 7B involves the smart phone 110c reading an advertisement 505 with a QR code 510 in operation 501 or the subscriber activating the embedded link 610 in an advertisement 601 in the electronic reading material on a reading device 220. If the link 610 has been activated, an indicator message 704 is sent to the publisher 490 where it is processed. Furthermore, as a result of either action (reading the QR code 510 or activating the embedded link 610), an initial SMS message is in operation 702 or operation 705 is sent to the call center 470 wherein it is processed. The call loaded into the call back queue 720, and the contact information database 725 are updated as appropriate. Then the call back occurs in the voice call back 706.

However, in this embodiment, the user (e.g., associated with smart phone 110c) or subscriber (e.g., associated with device 220) does not answer in the voice call back 706. As a result, the appropriate status is updated by the call center 470 and the call center 470 originates a follow up SMS message in operation 757. Depending on the circumstances, the follow up or response message can be transmitted as an email instead of an SMS message to the user or subscriber or can be initially transmitted as an email and the email may then be interworked by a gateway into a SMS message that is transmitted to the user's or subscriber's communication device. Thus, as referred to herein, whenever the call center 470 sends an SMS message, in particular embodiments, this may include the call center 470 sending a message initially in an email format that is then converted to an SMS format. Depending on the embodiment, the response message can indicate that a call back was attempted, and inform the user or subscriber that another call back will be scheduled later, or that the user or subscriber can call the call center 470 at a specified telephone number at the user's or subscriber's convenience. In this manner, a missed call may not result in a lost marketing opportunity. If the call center 470 attempts the voice call back 706 which results in a no answer condition, the call center may inform the publisher 490 of this, so that the publisher is aware as well. Alternatively, the contact information database 725 may be shared with the publisher, advertiser, product manufacturer, etc. so as to allow them to measure the effectiveness of the advertising campaign.

Exemplary Processing Flow

FIG. 8 illustrates one embodiment of a process flow for the publisher 490 to process the indicator message as illustrated above. The process flow operations are numbered based on information that can be transmitted. The logical operations described herein may be implemented as a sequence of computer implemented acts or as one or more program modules running on a computing system and/or as interconnected machine logic circuits or circuit modules within a computing system. The implementation is a matter of choice dependent on the performance and other requirements of the computing system. Accordingly, the logical operations described herein are referred to variously as-states operations, structural devices, acts, or modules. These operations, structural devices, acts and modules may be implemented in software, in firmware, in special purpose digital logic, and any combination thereof. Greater or fewer operations may be performed than shown in the figures and described herein. These operations may also be performed in a different order than those described herein.

Turning to FIG. 8, the process 800 begins with operation 805 when an indicator message 704 is sent from the device 220 used by the subscriber to read the electronic reading material to the publisher 490 as a result of subscriber activating the embedded link 610. Depending on the embodiment, the indicator message 704 may be received directly at a server at the publisher or relayed from another server to the publisher. In operation 810, the indicator message is analyzed to determine what subscriber is associated with the message. Depending on the embodiment, the analysis may involve ascertaining the subscriber by analyzing information contained within the message and/or may involve retrieving information on the subscriber from one or more data sources. In operation 815, the indicator message is further analyzed to determine the campaign associated with the message. Again, similar to determining the subscriber, the analysis may involve ascertaining the campaign by analyzing information contained within the message and/or may involve retrieving information on the campaign from one or more data sources.

Finally, in operation 820, the process 800 concludes with constructing and sending a notification message to the call center 470. Depending on the embodiment, the notification message may comprise different information such as, for instance, information on the campaign associated with the message and/or information on the subscriber associated with the message. For example, in one embodiment, the campaign information may include a campaign identifier that the call center 470 may use to identify the campaign associated with the message. In addition, in one embodiment, the subscriber information may include the name of the subscriber and information on how to contact the subscriber, such as a telephone number and/or email address. Further, as previously described, the notification message may take a number of different formats depending on the embodiment. For example, in various embodiments, the notification message may take the format of one of a SMS message, email message, or voice call message. In other embodiments, the publisher 490 may use an application program interface to interface with various computers in the call center. Once received, the call center 470 may then process the notification message and contact the subscriber in an appropriate manner.

Figure 9:
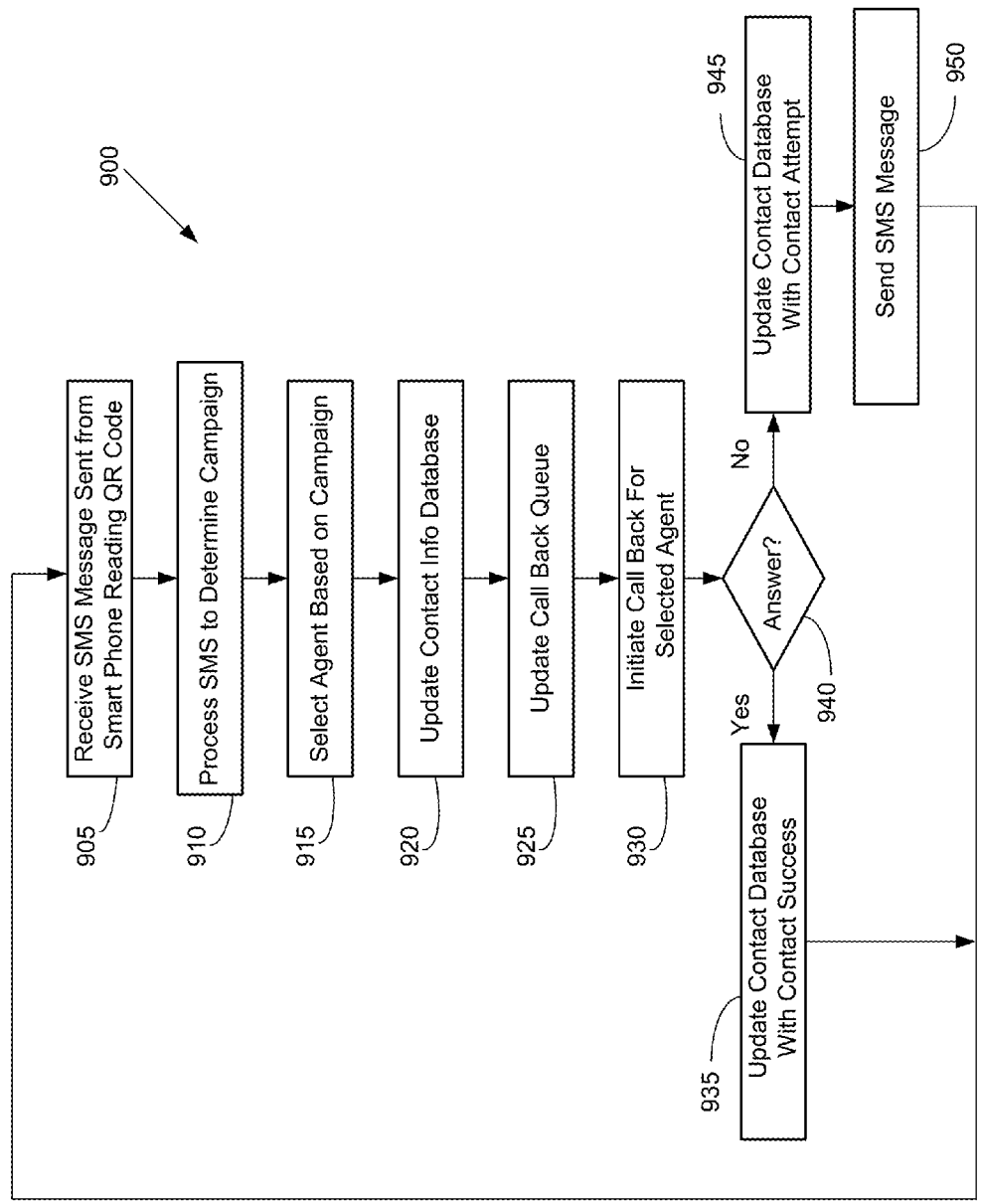
FIG. 9 shows one embodiment of a process flow for a call center to process a SMS communication.

Likewise, FIG. 9 illustrates one embodiment of a process flow for the call center 470 to process the communication received by the call center 470 as illustrated above. Similar to the process flow described above with respect to the publisher 490, the process flow operations are numbered based on information that can be transmitted. The logical operations described herein are implemented as a sequence of computer implemented acts or as one or more program modules running on a computing system and/or as interconnected machine logic circuits or circuit modules within a computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. Greater or fewer operations may be performed than shown in the figures and described herein. These operations may also be performed in a different order than those described herein.

Turning to FIG. 9, the process 900 begins with operation 905 when a communication (e.g., SMS message) is sent from either the smart phone 110*c* to the call center 470 as a result of reading a QR code 510 or the publisher 490 as a result of a subscriber activating the embedded link 610. Depending on the embodiment, the SMS message may be received at a messaging server at the call center or relayed from another server. In operation 910, the SMS message is analyzed to determine the campaign it is associated with. Depending on the embodiment, the analysis can be accomplished by analyzing information such as the called number, the text contents of the message, or both.

In operation 915, the agent is selected based on the identified campaign. In particular instances, the campaign may require an agent with appropriate training for handling a call associated with that campaign. Contemporaneously, the contact information database 725 in operation 920 may be updated and the call back queue 720 is updated in operation 925, followed by the call back involving the selected agent occurring in operation 930.

If the call is answered in operation 940, then the agent converses with the user or subscriber. As a result, in particular embodiments, the call center 470 will update the contact information database 725 in operation 935 with an indication that the call back occurred. In particular embodiments, the agent may indicate a disposition code and/or other information that may be recorded so that a complete record of the call back is maintained. If the call is not answered in operation 940, then the contact information database 725 is updated to reflect the unsuccessful attempt in operation 945. As a result, a follow up SMS message may be sent in operation 950 in particular embodiments.

Figure 10:
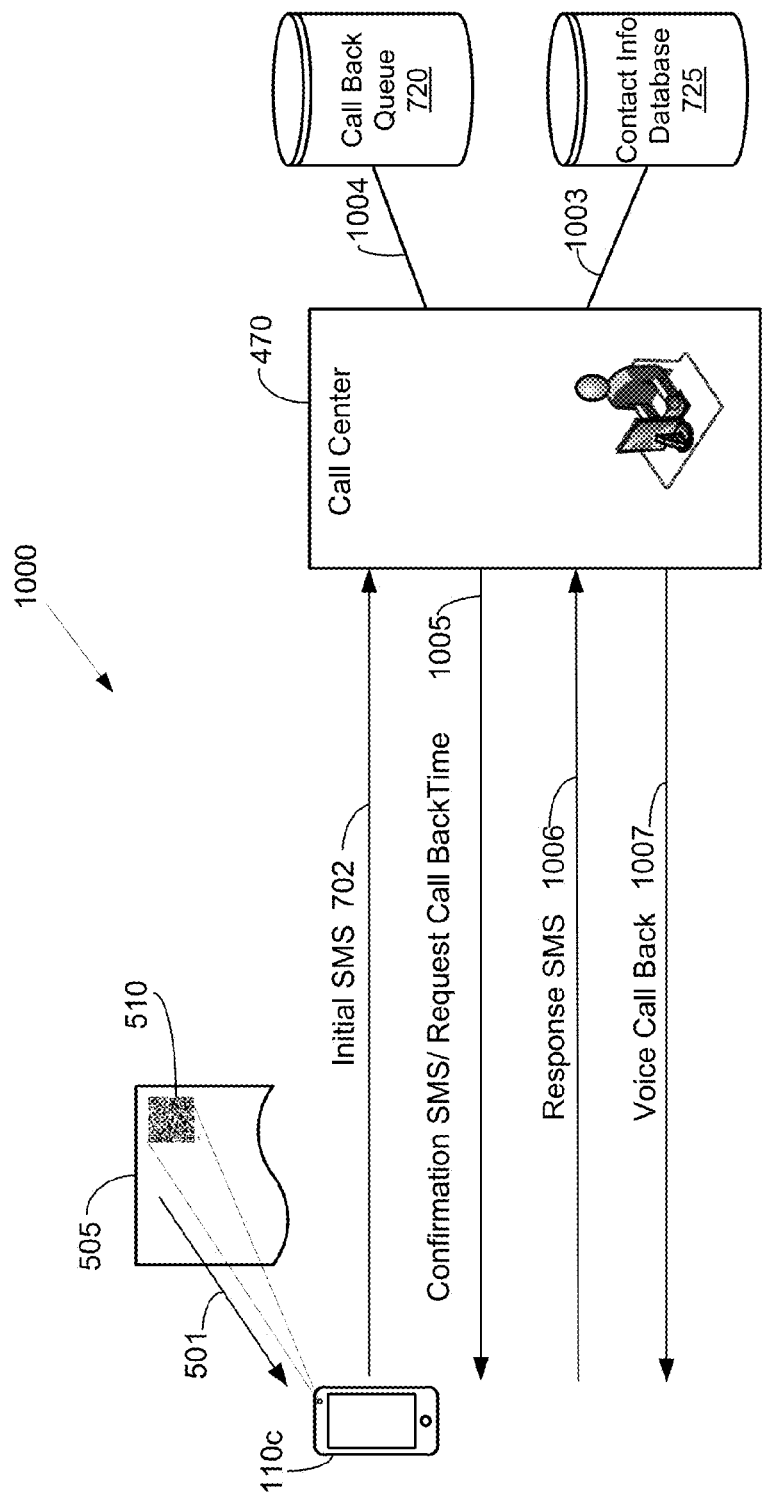
FIG. 10 shows another embodiment of a call center responding to a SMS communication generated by a smart phone reading a QR code.

FIG. 10 illustrates another variation of how a communication received from a smart phone 110c reading a QR code 510 can be processed by a call center 470. It should be noted that FIG. 10 only displays a communication originating as a result of a smart phone 110c reading a QR code 510. However, it should be understood by those of ordinary skill in the art that the process described in FIG. 10 can also involve a communication originating as a result of a subscriber activating an embedded link 610 in electronic reading material.

Turning to FIG. 10, the process 1000 begins with a smart phone 110c reading the QR code 510 on an advertisement 505 in operation 501 and as a result, an initial SMS message is generated in operation 702 to the call center 470. Accordingly, the call back queue 720 is updated in operation 1004 and the contact information database 725 is updated in operation 1003.

In this particular embodiment, the call center 470 sends back a confirmation SMS requesting a call back time in operation 1005. The call center 470 may trigger this response as a matter of course for this campaign. For example, if the call back time would exceed the regulatory time window for a telemarketing call, the call center 470 may send back the SMS message in operation 1005 to select a time that is within the calling window. In another example, the request may require an agent with particular skills to be involved in the call back (e.g., certain language skills) that may not be immediately available. Depending on the embodiment, a number of different conditions may prohibit an immediate call back that may trigger this message. The message could request, for example, that the user respond with a time frame for when the call back by the call center could occur.

In operation 1006, the response SMS message is sent by the user to the call center 470 indicating the requested time for a call back. The response SMS message could also indicate, for example, a particular number to call for receiving the call back. Finally, in operation 1007, the voice call back occurs as requested in the response SMS message.

Figure 11:
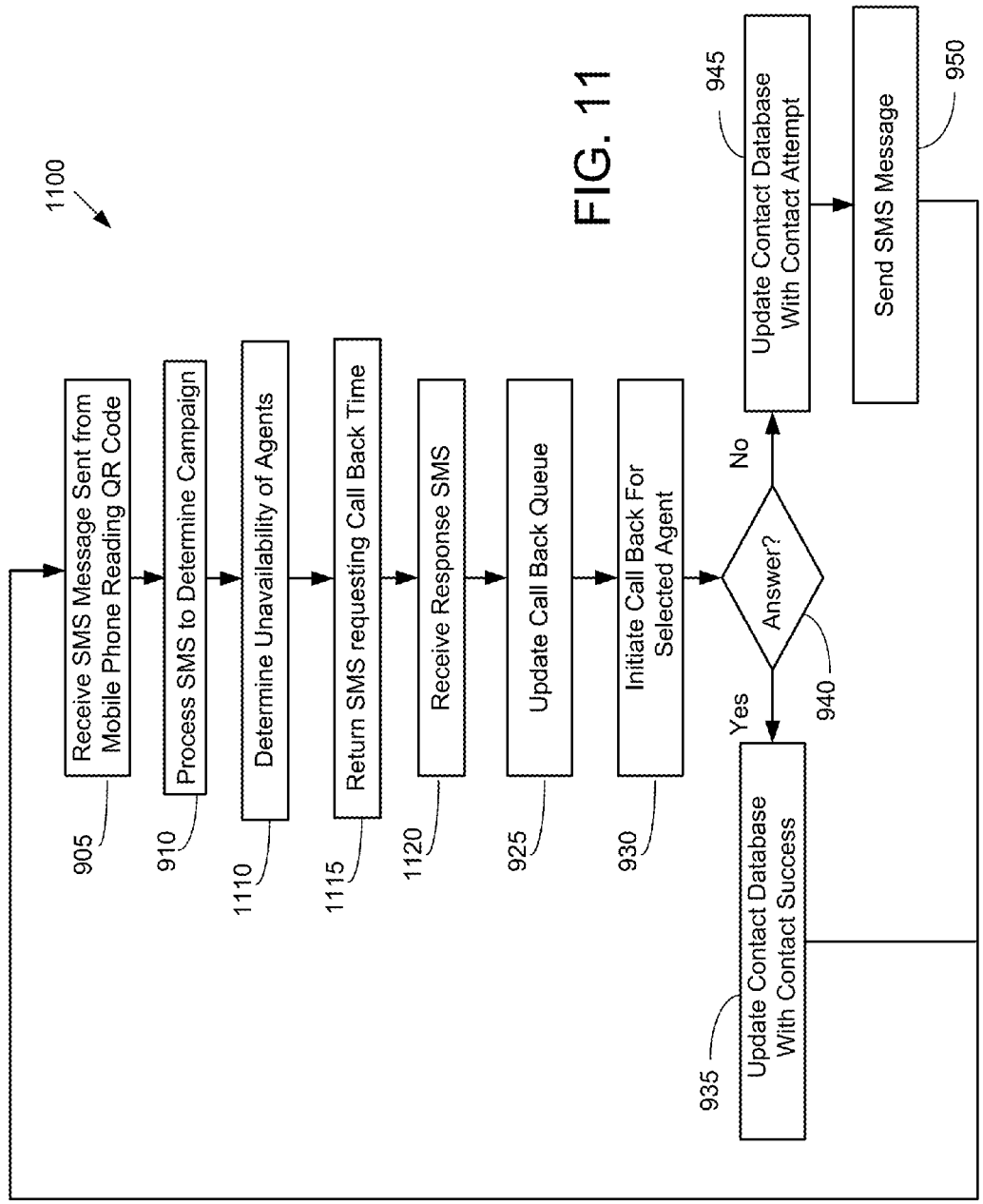
FIG. 11 shows another embodiment of a process flow for the call center to process a SMS communication.

The process flow for the call center processing is shown in FIG. 11 and is similar to FIG. 9. However, for this process 1100, in operation 1110 the call center 470 may determine the existence of a condition that precludes an immediate call back, such as the unavailability of an agent. This may trigger the call center 470 to return the SMS message in operation 1115 to schedule a call back time. In operation 1120, the response SMS message is received and used to update the call back queue in operation 925. The other operations are the same as discussed for FIG. 9.

Relationship of Entities Involved in Integrating a QR Code or Embedded Link with a Call Center The integration of QR codes 510 with a call center 470 may involve an advertising campaign coordinated with a call campaign using QR codes 510. This may involve the various entities discussed above operating in a coordinated manner, including, for example: a call center 470, a wireless service provider, an advertising/marketing agency, and a provider of goods or services.

Figure 12:
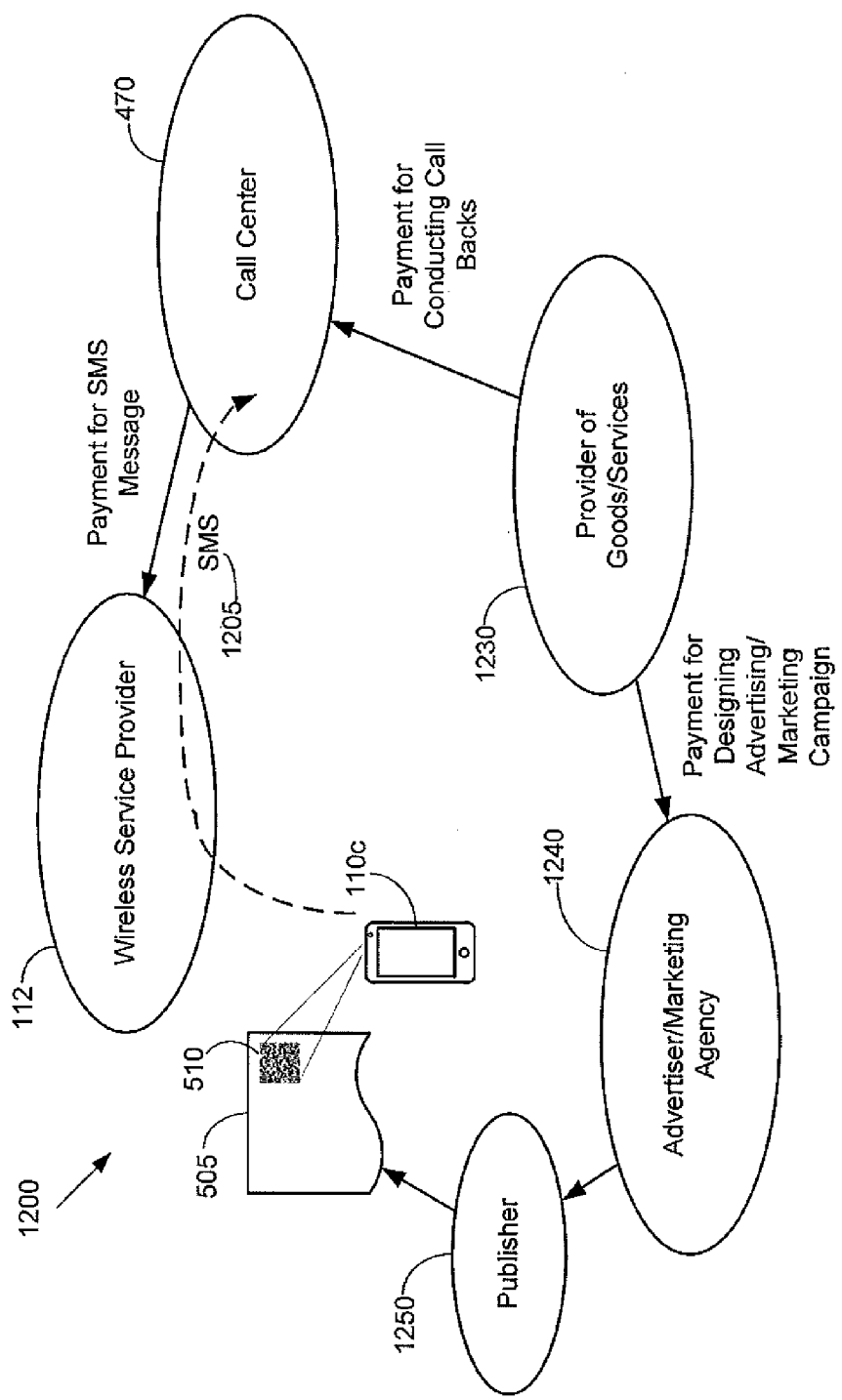
FIG. 12 shows one embodiment of relationships between various entities involved in a campaign utilizing a QR code and a call center.

FIG. 12 illustrates one potential arrangement of relationships 1200 between these entities for conducting a campaign involving QR codes 510. Turning to FIG. 12, the smart phone 110c is shown reading a QR code 510 that is on an advertising medium 505. For purposes of illustration, the advertising medium 505 may be a magazine produced by a publisher 1250 of printed materials. In other embodiments, the advertising medium 505 may be a billboard, and a billboard operator may be involved. In another embodiment, the advertising medium 505 may be a direct mail piece, and a direct mail marketing entity may be involved.

The publisher 1250 places an advertisement by selling a service to an advertising/marketing agency 1240 that designs the advertisement campaign. The advertising/marketing agency 1240 may place a number of various types of advertisements using a number of publishers, direct mail marketing entity, etc. Typically, the advertising/marketing agency 1240 will purchase a defined amount of ad space, and hence a payment is made to the publisher 1250 for running the advertisement with the QR code 510.

The advertising/marketing agency 1240 may be hired by a provider of goods/services ("Provider") 1230 to define and execute the advertisement campaign. The Provider 1230 may be a local business franchise to a national manufacturer or service provider. Typically, the Provider 1230 pays the advertising/marketing agency 1240 to execute the advertising campaign.

The Provider 1230 may coordinate a call campaign with a call center 470. In some embodiments, the advertising/marketing agency 1240 may do this on behalf of the Provider 1230. The call center 470 prepares to handle the communication and respond according to a defined manner—hence the call center 470 must implement a call campaign. Up to this point, the term "campaign" without any further qualification could refer to an advertising campaign or a call campaign. In the context of FIG. 12, the actions performed by the call center 470 are distinct from the actions performed by the advertising/marketing agency 1240. It is evident that there must be coordination between the various entities. For example, the destination telephone number indicated in a QR code 510 for addressing the communication from a smart phone 110c to a call center 470 must route the communication to the call center 470, and further this value may be required by the call center 470 to be associated with a particular calling campaign.

The call center 470 may, in some embodiments, have an arrangement where it reimburses the wireless service provider 112 for a SMS message 1205 sent from the smart phone 110c to the call center 470. This third party billing arrangement for SMS messages (or other electronic data communications) associated with the QR code 410 may exist as an incentive for the user to read the QR code 410. The call center 470 may record each of the SMS messages received. In another embodiment, the wireless service provider 1210 may also record the SMS message 1205 sent to the call center 470. This allows the call center 470 to effectively pay for the electronic communication, and a subsequent settling of accounts may occur between the call center 470 and the Provider 1230. In other embodiments, the advertising/marketing agency 1240 or the Provider 1230 may pay the wireless service provider 112.

The SMS message 1205 may be delivered instead to another entity, which is then forwarded to the call center 470. For example, the Provider 1230 may initially receive the electronic communication and forward a copy to the call center 470. Those skilled in the art will recognize various other arrangements and configurations are possible.

The SMS messages received at the call center 470 may be stored in whole or in part in the contact information database 725 of FIG. 7A, for example. If the destination address is used to identify the calling campaign, then a report from the contact information database 725 can be generated for all received SMS messages for a particular campaign. The number of messages received can be the basis for the call center 470 to reimburse the wireless service provider 112. For example, since the wireless service provider 112 may not bill the originating users for transfer of the SMS messages, the call center 470 could pay the wireless service provider 112 based on the number of received SMS messages. The call center 470 may further have to pay for any response SMS messages sent to users by the call center 470. Other billing arrangements are possible.

In other embodiments, the functions of one of the entities identified above may be merged, integrated, performed, or subsumed by another entity. For example, a call center 470 could perform the functions of an advertising/marketing agency 1240 and coordinate for the publication of the advertisement. In other embodiments, the call center 470 may be internal to, or controlled by, the Provider 1230. In other embodiments, the call center 470 may be integrated with the wireless service provider 112, which may occur if the wireless service provider is contacting its own subscribers for promotions, etc.

The call center 470 may incorporate an electronic consent database based on the electronic communication received from the user. Thus, the architecture, concepts and technologies disclosed in the previously-mentioned patent applications may be incorporated in the call center 470.

In similar fashion, the integration of embedded links 610 in electronic reading material with a call center 470 may also involve an advertising campaign coordinated with a call campaign with the various entities discussed above operating in a coordinated manner, including, for example: the call center 470, the wireless service provider 112, the advertising/marketing agency 1240, and the Provider 1230. However, in this instance, the call campaign uses links 610 in place of the QR codes 510 and the campaigns involve a publisher of electronic reading material 490 (instead of, or in addition to, a publisher 1250 of printed materials) operating in a coordinated manner with the other entities.

Figure 13:
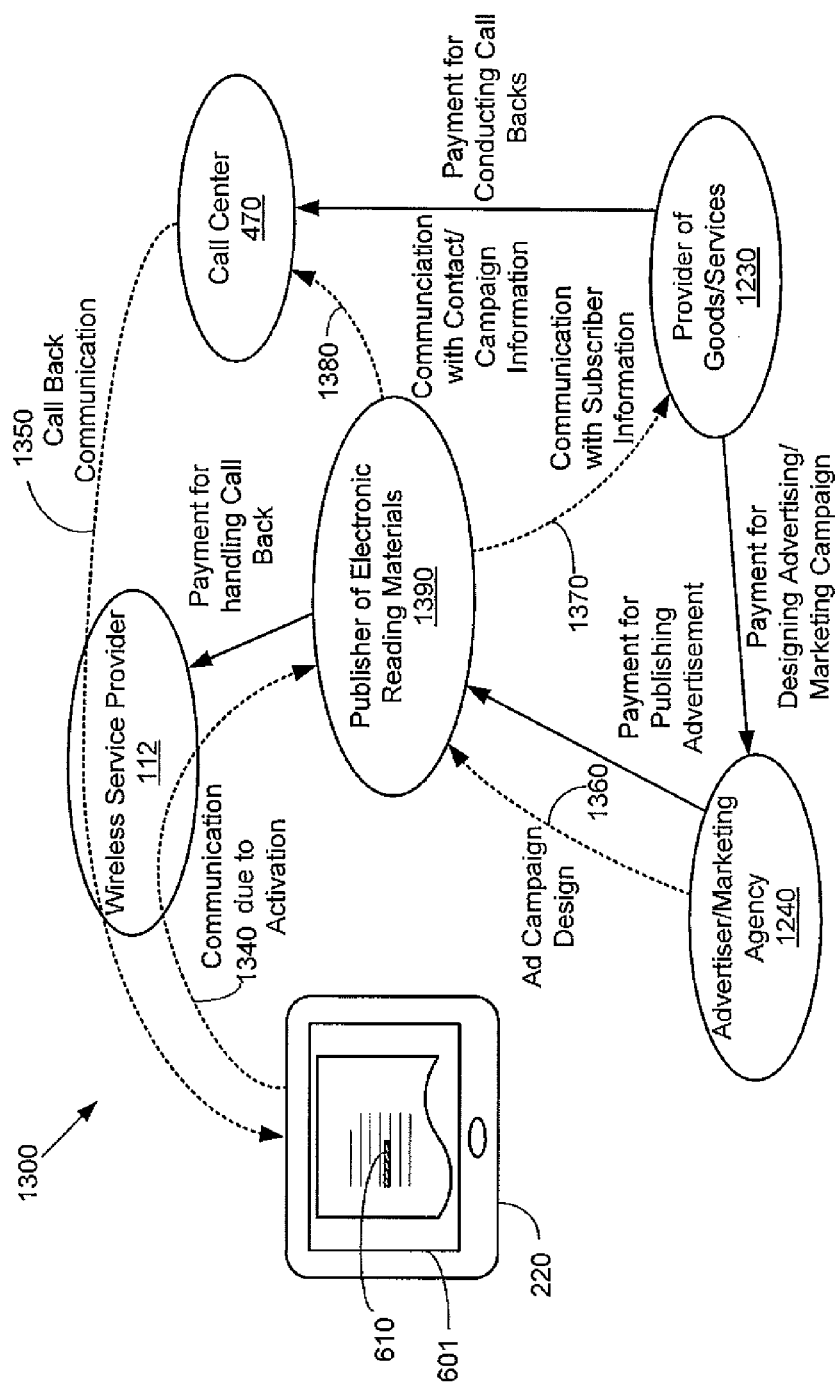
FIG. 13 shows one embodiment of relationships between various entities involved in a campaign utilizing a link and a call center.

FIG. 13 illustrates one potential arrangement of relationships 1300 between these entities for conducting a campaign involving embedded links 610. Turning to FIG. 13, the subscriber activates a link 610 embedded in an advertisement 601 in electronic reading material displayed on a device 220 which can be an e-reader or tablet. For purposes of illustration, the electronic reading material may be an issue of a periodical, such as a magazine, subscribed to by the subscriber through the publisher of electronic reading materials 1390. Activation of the link 610 typically results in a communication 1340 being sent to the publisher 1390, for example, over an Internet channel and/or cellular channel. As a result, the publisher 1390 sends a communication 1380 to the call center 470 providing contact and/or campaign information and the call center 470 acts accordingly. In addition, in particular embodiments, the publisher 1390 sends a communication 1370 to the Provider 1230 that includes information on the subscriber that has activated the link 610.

Similar to a publisher of printed materials 1250, the publisher of electronic reading materials 1390 places the advertisement 601 in electronic reading material by selling a service to the advertising/marketing agency 1240 that designs the advertisement campaign. Typically, the advertising/marketing agency 1240 will provide the ad campaign design 1360 to the publisher 1390, and hence a payment is made to the publisher 1390 for placing the advertisement 601 with the embedded link 610 in the issue of the periodical.

Similar to before, the advertising/marketing agency 1240 may be hired by the Provider 1230 to define and execute the advertisement campaign and the Provider 1230 pays the advertising/marketing agency 1240 to execute the advertising campaign. Likewise, the Provider 1230 may coordinate a call campaign with a call center 470 or the advertising/marketing agency 1240 or publisher 1390 may do this on behalf of the Provider 1230. However, in this instance, the call center 470 may not only need to prepare to handle communications associated with the call campaign and respond according in a defined manner, but the publisher 1390 may also need to prepare to handle communications received as a result of embedded links 610 being activated and communications sent to the call center 470 associated with the call campaign. Thus, in many instances involving embedded links 610, coordination must generally exist between the publisher 1390 and the call center 470.

Further, in particular embodiments, an arrangement may be set up in a similar fashion as with respect to communications involving QR codes 510 for the publisher 1390 to pay the wireless service provider 112 for any response messages sent to subscribers by the call center 470 (e.g., call back communications 1350). In addition, an arrangement may be set up for the publisher 1390 to pay the wireless service provider 112 for messages sent from a subscriber's device 220 over a channel provided by the wireless service provider 112 if such a channel is used. However, other billing arrangements are possible in which, for example, the Provider 1230 and/or call center 470 provides payment for such communications handled by the wireless service provider 112. In addition, in certain embodiments, arrangements may be made for the publisher 1390 to be reimbursed by the Provider 1230 for payments made to the wireless service provider 112.

In other embodiments, the functions of one of the entities identified above may be merged, integrated, performed, or subsumed by another entity. For example, a call center 470 and/or publisher 1390 could perform the functions of the advertising/marketing agency 1240 and coordinate for the publication of the advertisement. In other embodiments, the call center 470 may be internal to, or controlled by, the Provider 1230. In other embodiments, the call center 470 may be integrated with the wireless service provider 112, which may occur if the wireless service provider is contacting its own subscribers for promotions, etc.

Exemplary Processing Device Architecture

Figure 14:
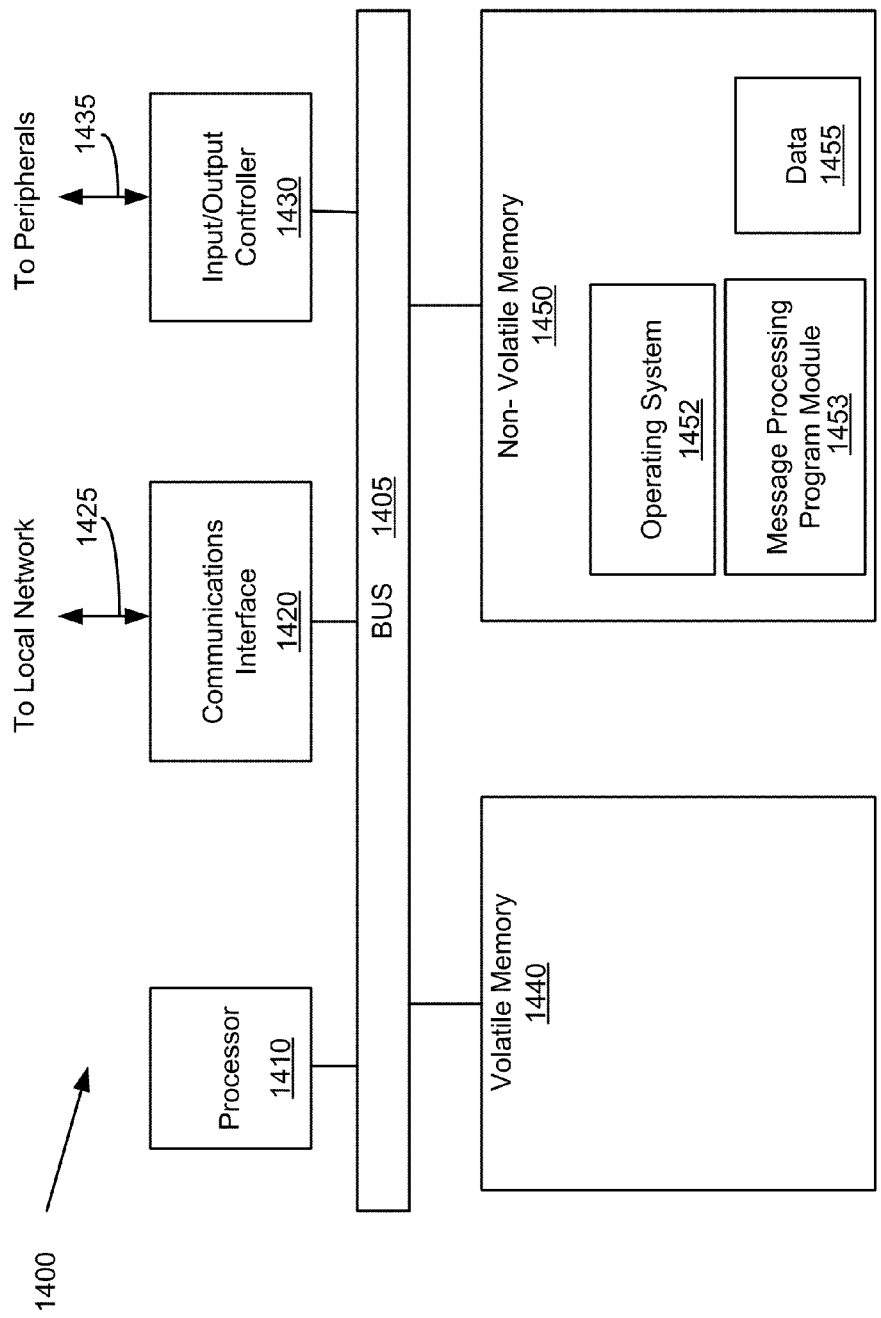
FIG. 14 is an exemplary schematic diagram of a processing device used in one embodiment to practice the technologies disclosed herein.

As discussed in conjunction with FIG. 1 and FIG. 2, the call center architecture 100 may comprise various components, such as servers, front end, databases, that comprise a processing system, FIG. 14 is an exemplary schematic diagram of a computer processing device that may be used in an embodiment of the call center architecture to practice the technologies disclosed herein. FIG. 14 provides an exemplary schematic of a processing device system 1400, which could represent individually or in combination, for example, the ACD 130, CTI server 145, dialer 150, publisher server 205, data store 215, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 14, the processing system 1400 may include one or more processors 1410 that may communicate with other elements within the processing system 1400 via a bus 1405. The processor 1410 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1400 may also include one or more communications interfaces 1420 for communicating data via the local network 170 with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1430 may also communicate with one or more input devices or peripherals using an interface 1435, such as, but not limited to: a keyboard, a mouse, a touch screen/display input, microphone, pointing device, etc. The input/output controller 1430 may also communicate with output devices or peripherals, such as displays, printers, speakers, headsets, banner displays, etc.

The processor 1410 may be configured to execute instructions stored in volatile memory 1440, non-volatile memory 1450, or other forms of computer readable storage media accessible to the processor 1410. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1450 may store program code and data, which also may be loaded into the volatile memory 1440 at execution time. Specifically, the non-volatile memory 1450 may store one or more message processing program modules 1453 and/or operating system code 1452 containing instructions for performing the process and/or functions associated with the technologies disclosed herein. The message processing program module 1453 may also access, generate, or store data 1455, such as the aforementioned records and data, in the non-volatile memory 1450, as well as in the volatile memory 1440. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 1410. These may form a part of, or may interact with, the message processing program module 1453.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A call center system comprising:
a dialer comprising a processor configured to receive a message as a result of a camera-equipped mobile device operated by a user reading a two-dimensional barcode ("2D barcode") provided on an advertisement,
wherein the 2D barcode is encoded to cause generation of at least a portion of a content of the message transmitted to a destination address, the message requesting a subsequent communication comprising a voice call associated with a promotion indicated in the advertisement, and
wherein the processor is configured to
determine a calling campaign associated with a plurality of agents in the call center by using the destination address associated with the message,
select an available agent from among the plurality of agents for handling the voice call to the user of the mobile device, and
cause the dialer to originate the voice call as the subsequent communication to the mobile device using an originating number associated with the message.

2. The call center system of claim 1, wherein the processor is further configured to send a response message prompting the user to indicate a time for the voice call.

3. The call center system of claim 2, wherein the response message comprises one or more times for the voice call.

4. The call center system of claim 1, wherein the processor is further configured to:
update a queue associated with the voice call so that the voice call has a higher priority relative to another voice call in the queue, wherein the another voice call in the queue is not associated with any message requesting a callback.

5. The call center system of claim 1, wherein the message comprises an SMS message transmitted by the mobile device.

6. The call center system of claim 5, wherein the originating number comprises a telephone number of the mobile device.

7. The call center system of claim 1, wherein the processor is further configured to cause a display of a computer used by the agent to present at least a portion of the content of the message.

8. The non-transitory computer readable storage medium of claim 1, wherein the message comprises an SMS message transmitted by the mobile device.

9. A non-transitory computer readable storage medium having instructions stored thereon, which when executed by a processor in a dialer cause the processor to:
receive a message as a result of a camera-equipped mobile device operated by a user reading a two-dimensional barcode ("2D barcode") provided on an advertisement, wherein the 2D barcode is encoded to cause generation of at least a portion of a content of the message transmitted to a destination address associated with a call center comprising a plurality of agents, the message requesting a subsequent communication comprising a voice call associated with a promotion indicated in the advertisement;
identify a calling campaign from among a plurality of calling campaigns by using the destination address associated with the message, wherein the calling campaign is associated with the 2D barcode on the advertisement;
select an available agent in the call center from the plurality of agents for handling the voice call as the subsequent communication to the user of the mobile device; and
cause the dialer to originate the voice call using an originating number associated with the message, wherein the voice call is connected to a phone used by the available agent.

10. The non-transitory computer readable storage medium of claim 9, wherein the instructions when executed further cause the processor to send a response message, before the dialer originates the voice call, prompting the user to select a time for the voice call.

11. The non-transitory computer readable storage medium of claim 9, wherein the instructions when executed further cause the processor to send a response message to the mobile device for prompting the user to select a time for a subsequent voice call in response to the user not answering the voice call.

12. The non-transitory computer readable storage medium of claim 9, wherein the instructions when executed further cause the processor to store a copy of the message in an electronic consent database comprising a plurality of user-provided electronic consents for receiving calls.

13. The non-transitory computer readable storage medium of claim 9, wherein the instructions when executed further cause the processor to transmit a response message to the mobile device acknowledging receipt of the message.

14. The non-transitory computer readable storage medium of claim 9, wherein the instructions when executed further cause the processor to cause a display of a computer used by the agent to present at least a portion of the content of the message.

15. A computer implemented method for integrating use of a two-dimensional barcode ("2D barcode") with a call center comprising a dialer configured to originate voice calls associated with a calling campaign, the method comprising:
receiving a message at the call center as a result of a camera-equipped mobile device operated by a user reading the 2D barcode provided on an advertisement, wherein the 2D barcode is encoded to generate at least a portion of a content of the message to be transmitted to a destination address, the message requesting a subsequent communication comprising a call associated with a product or service indicated by the advertisement;
determining the calling campaign by the call center by using the destination address of the message;
selecting an available agent from among a plurality of agents in the call center assigned to the calling campaign to handle the subsequent communication to the user of the mobile device; and
originating the call to the user by the dialer in the call center as the subsequent communication by using an originating address associated with the message.

16. The computer implemented method of claim 15, wherein the message is a text message and the originating address is a telephone number.

17. The computer implemented method of claim 7, wherein a wireless service provider transmits the message from the mobile device and is compensated monetarily for transmission of the message by an entity other than the user.

18. The computer implemented method of claim 17, wherein the entity compensating the wireless service provider is the call center and compensation is based on the message transmitted by the mobile device to the destination address.

19. The computer implemented method of claim 16, further comprising:
transmitting a response message to the mobile device from the call center wherein the response message acknowledges receipt of the message.

20. The computer implemented method of claim 15 further comprising sending a response message to the user by the call center that prompts the user to select a time for the subsequent communication.

21. The computer implemented method of claim 15 further comprising:
storing a copy of the message in an electronic consent database, the message indicating consent for receiving the subsequent communication.

22. The computer implemented method of claim 15, wherein the message is sent from a gateway as an email message to the call center, and the email message comprises a destination telephone number, and the call center uses the destination telephone number as the originating address for the call to the user.

23. The computer implemented method of claim 15 further comprising, as a result of receiving the message in the call center, placing a request with a higher priority relative to other requests in a call back queue of the dialer to originate the subsequent communication.

24. The computer implemented method of claim 15, wherein determining the calling campaign from among a plurality of calling campaigns further involves analyzing the content of the message.

25. The computer implemented method of claim 15, wherein the message is received as an SMS message at a gateway and transformed into an email message sent from the gateway to the call center.

\* \* \* \* \*